(12) United States Patent
Ionescu et al.

(10) Patent No.: US 12,393,654 B2
(45) Date of Patent: Aug. 19, 2025

(54) SYSTEM AND METHOD FOR DISENTANGLING FEATURES SPECIFIC TO USERS, ACTIONS AND DEVICES RECORDED IN MOTION SENSOR DATA

(71) Applicant: Veridium IP Limited, London (GB)

(72) Inventors: Radu Tudor Ionescu, Galati (RO); Nicolae-Cătălin Ristea, Ploiesti (RO); Cristina Mădălina Noaică, Bucharest (RO); Radu-Mihai Vlad, Calarasi (RO); Ionuț Dumitran, Bucharest (RO)

(73) Assignee: VERIDIUM IP LIMITED, London (GB)

( * ) Notice: Subject to any disclaimer, the term of this patent is extended or adjusted under 35 U.S.C. 154(b) by 1062 days.

(21) Appl. No.: 17/142,899

(22) Filed: Jan. 6, 2021

(65) Prior Publication Data

US 2021/0209508 A1 Jul. 8, 2021

Related U.S. Application Data

(60) Provisional application No. 62/957,653, filed on Jan. 6, 2020.

(51) Int. Cl.
*G06N 20/00* (2019.01)
*G06F 18/21* (2023.01)
(Continued)

(52) U.S. Cl.
CPC ........ *G06F 21/316* (2013.01); *G06F 18/2132* (2023.01); *G06F 18/217* (2023.01);
(Continued)

(58) Field of Classification Search
CPC .. G06F 21/316; G06F 18/2132; G06F 18/217; G06F 21/32; G06F 2218/16; G06N 20/00
See application file for complete search history.

(56) References Cited

U.S. PATENT DOCUMENTS

2019/0286242 A1 9/2019 Ionescu
2019/0370666 A1* 12/2019 Ros Sanchez ......... G06N 3/088
(Continued)

FOREIGN PATENT DOCUMENTS

KR 20190099156 A 8/2019

OTHER PUBLICATIONS

Iso, T., & Yamazaki, K. (Sep. 2006). Gait analyzer based on a cell phone with a single three-axis accelerometer. In Proceedings of the 8th conference on Human-computer interaction with mobile devices and services (pp. 141-144). (Year: 2006).*
(Continued)

*Primary Examiner* — Michael J Huntley
*Assistant Examiner* — Maggie Thanh Maido
(74) *Attorney, Agent, or Firm* — Leason Ellis LLP

(57) ABSTRACT

Methods and systems for disentangling discriminative features of a user of a device from motion signals and authenticating a user on a mobile device are provided. In at least one aspect of the methods and systems, each captured motion signal is divided into segments. The segments are then converted into translated segments using one or more trained translation algorithms. The segments and translated segments are then provided to a machine learning system. Discriminative features of the user are then extracted from the segments and translated segments with the processor using the machine learning system that applies one or more feature extraction algorithms.

19 Claims, 13 Drawing Sheets

(51) Int. Cl.
   *G06F 18/2132*   (2023.01)
   *G06F 21/31*   (2013.01)
   *G06F 21/32*   (2013.01)
(52) U.S. Cl.
   CPC .............. *G06F 21/32* (2013.01); *G06N 20/00* (2019.01); *G06F 2218/16* (2023.01)

(56) References Cited

U.S. PATENT DOCUMENTS

2020/0042687 A1    2/2020  Choi et al.
2020/0066071 A1*   2/2020  Budman ................. H04L 63/08

OTHER PUBLICATIONS

Gu, F., Kealy, A., Khoshelham, K., & Shang, J. (Dec. 2015). User-independent motion state recognition using smartphone sensors. Sensors, 15(12), 30636-30652. (Year: 2015).*

Barsoum, E., Kender, J., & Liu, Z. (Jun. 2018). Hp-gan: Probabilistic 3d human motion prediction via gan. In Proceedings of the IEEE conference on computer vision and pattern recognition workshops (pp. 1418-1427). (Year: 2018).*

Amini, S., Noroozi, V., Pande, A., Gupte, S., Yu, P. S., & Kanich, C. (Oct. 2018). Deepauth: A framework for continuous user re-authentication in mobile apps. In Proceedings of the 27th ACM International Conference on Information and Knowledge Management (pp. 2027-2035). (Year: 2018).*

International Search Report dated Apr. 22, 2021 corresponding to International Patent Application No. PCT/IB2021/050077; 14 pages.

N. Khanna, A.K. Mikkilineni, A.F. Martone, G.N. Ali, G.T.C. Chiu, J.P. Allebach, E.J. Delp. A survey of forensic characterization methods for physical devices. Digital Investigation, vol. 3S, pp. S17-S28, 2006.

E. Vildjiounaite, S.-M. Makela, M. Lindholm, R. Riihimaki, V. Kyllonen, J. Mantyjarvi, H. Ailisto. Unobtrusive multimodal biometrics for ensuring privacy and information security with personal devices In: Proceedings of International Conference on Pervasive Computing, 2006, pp. 187-201.

N. Clarke, S. Furnell. Advanced user authentication for mobile devices. Computers & Security, vol. 26, No. 2, 2007; pp. 109-119.

P. Campisi, E. Maiorana, M. Lo Bosco, A. Neri. User authentication using keystroke dynamics for cellular phones. Signal Processing, IET, vol. 3, No. 4, 2009, pp. 333-341.

I. Goodfellow, J. Pouget-Abadie, M. Mirza, B. Xu, D. Warde-Farley, S. Ozair, A. Courville, Y. Bengio. Generative Adversarial Nets. In: Proceedings of Advances in Neural Information Processing Systems, pp. 2672-2680, 2014.

A. Ferreira, L.C. Navarro, G. Pinheiro, J.A. dos Santos, A. Rocha. Laser printer attribution: Exploring new features and beyond. Forensic Science International, vol. 247, pp. 105-125, 2015.

K.R. Akshatha, A.K. Karunakar, H. Anitha, U. Raghavendra, D. Shetty. Digital camera identification using PRNU: A feature based approach. Digital Investigation, vol. 19, pp. 69-77, 2016.

G. Canfora, P. di Notte F. Mercaldo, C. A. Visaggio. A Methodology for Silent and Continuous Authentication in Mobile Environment. In: Proceedings of International Conference on E-Business and Telecommunications, pp. 241-265, 2016.

N. Neverova, C. Wolf, G. Lacey, L. Fridman, D. Chandra, B. Barbello, G. Taylor. Learning Human Identity from Motion Patterns. IEEE Access, vol. 4, pp. 1810-1820, 2016.

C. Shen, T. Yu, S. Yuan, S., Y. Li, X. Guan. Performance analysis of motion-sensor behavior for user authentication on smartphones. Sensors, vol. 16, No. 3, pp. 345-365, 2016.

A. Buriro, B. Crispo, F. Del Frari, K. Wrona. Hold & Sign: A Novel Behavioral Biometrics for Smartphone User Authentication. In: Proceedings of Security and Privacy Workshops, 2016. pp. 276-285.

J.Y. Zhu, T. Park, P. Isola, A.A. Efros. Unpaired image-to-image translation using cycle-consistent adversarial networks. In: Proceedings of IEEE International Conference on Computer Vision, pp. 2223-2232, 2017.

J. Kim, M. Kim, H. Kang, K. Lee. U-GAT-IT: Unsupervised generative attentional networks with adaptive layer-instance normalization for image-to-image translation. arXiv preprint arXiv:1907.10830, 2019. 19 pages.

Mario Frank et al : 11 Touchalytics: On the Applicability of Touchscreen Input as a Behavioral Biometric for Continuous Authentication,y X,P IEE Transactions on Information Forensics and Security, vol. 8, No. 1, Jan. 1, 2013 (Jan. 1, 2013), pp. 136-148.

Akhil Mathur et al: "Using deep data augmentation training to address software and hardware heterogeneities in wearable and smartphone sensing devices", Information Processing in Sensor Networks, IEEE Press, 445 Hoes Lane, PO Box 1331, Piscataway, NJ08855-1331USA, Apr. 11, 2018 (Apr. 11, 2018), pp. 200-211.

Chulhong Min et al: "SensiX: A Platform for Collaborative Machine Learning on the Edge", arxiv.org, Cornell University Library, 201 Olin Library Cornell University Ithaca, NY 14853, Dec. 5, 2020 (Dec. 5, 2020).

Chinese Office Action mailed Nov. 8, 2024 for the corresponding Chinese Patent Application No. 202180013376.4 (36 pages including English translation).

* cited by examiner

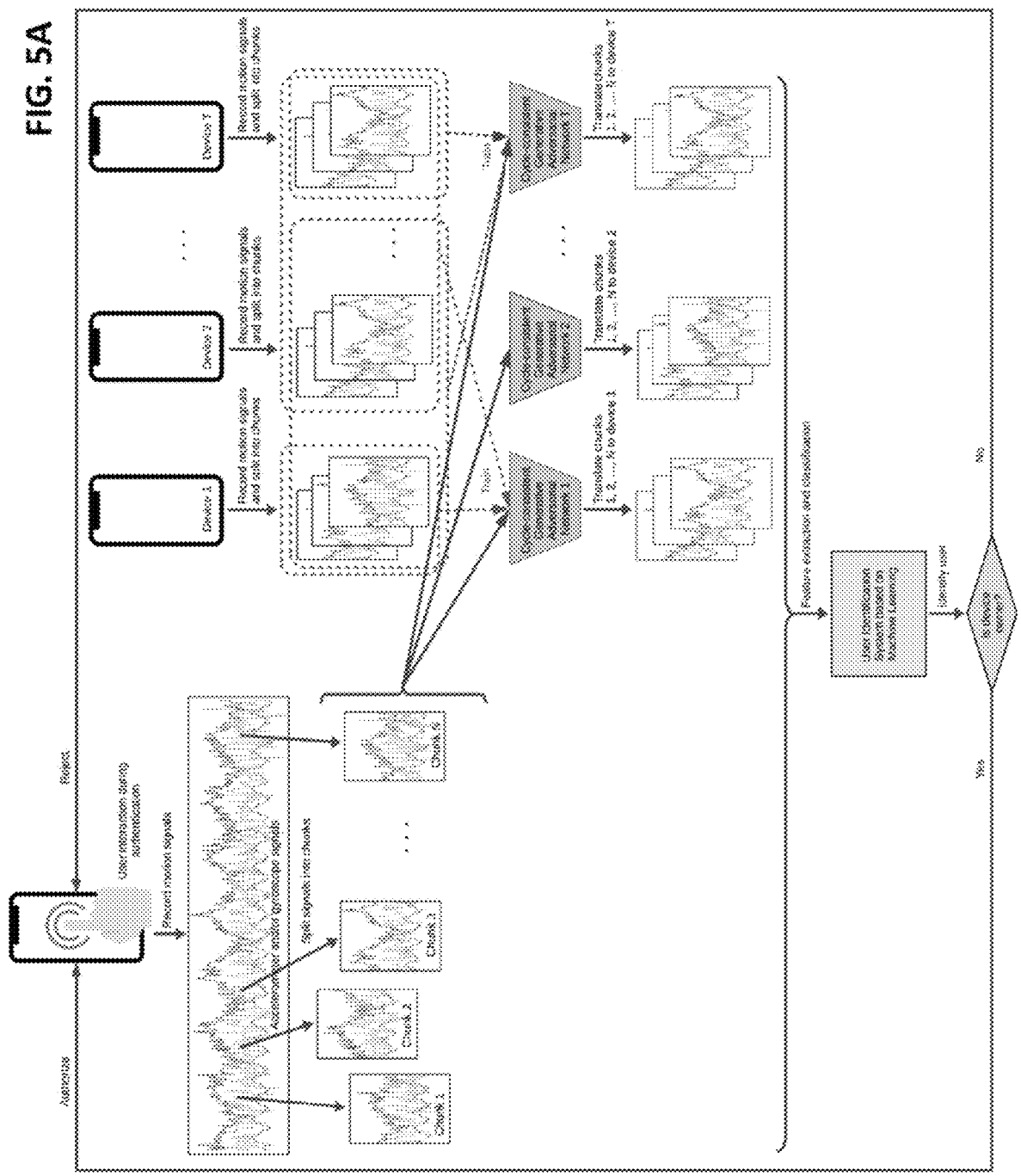

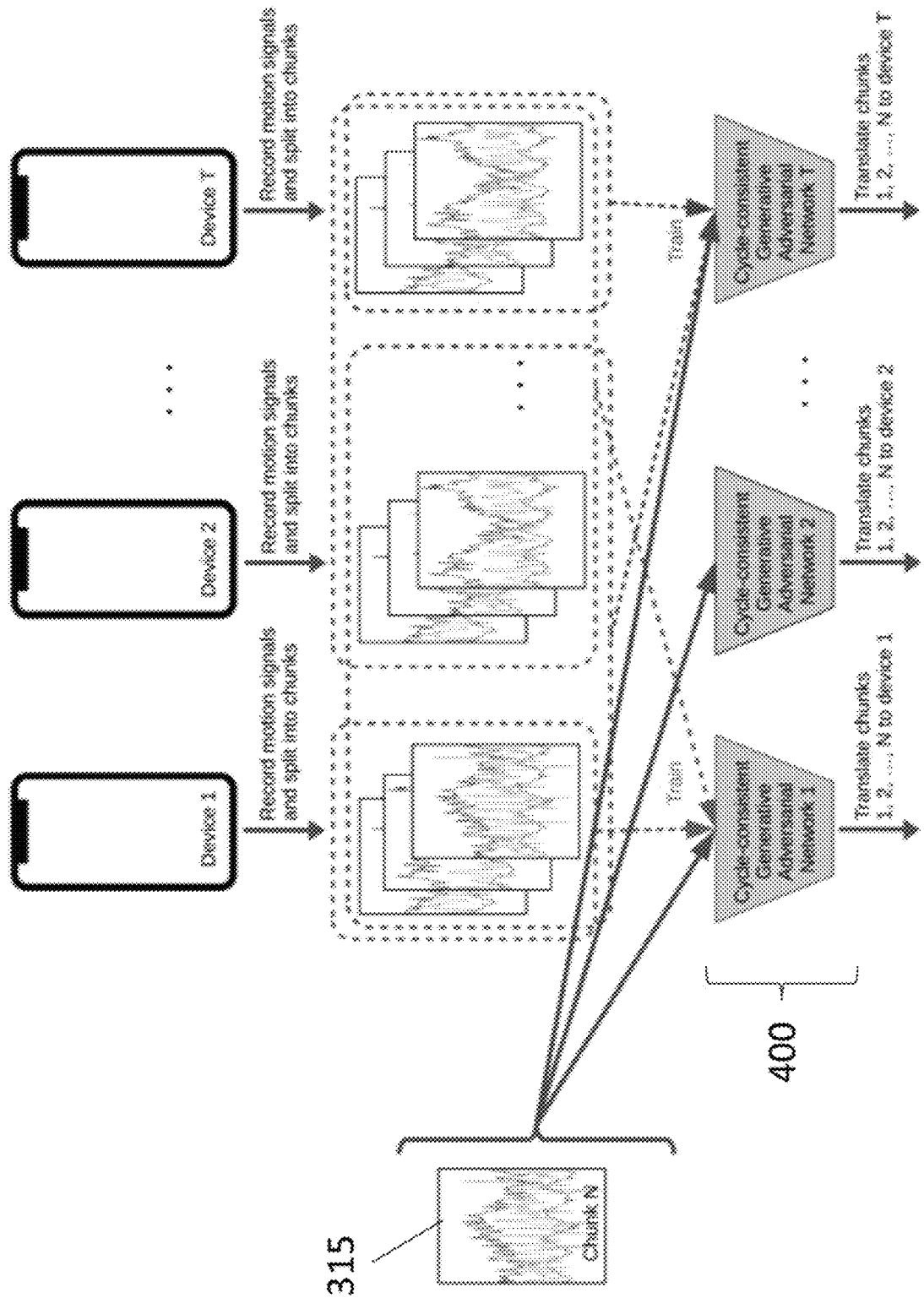

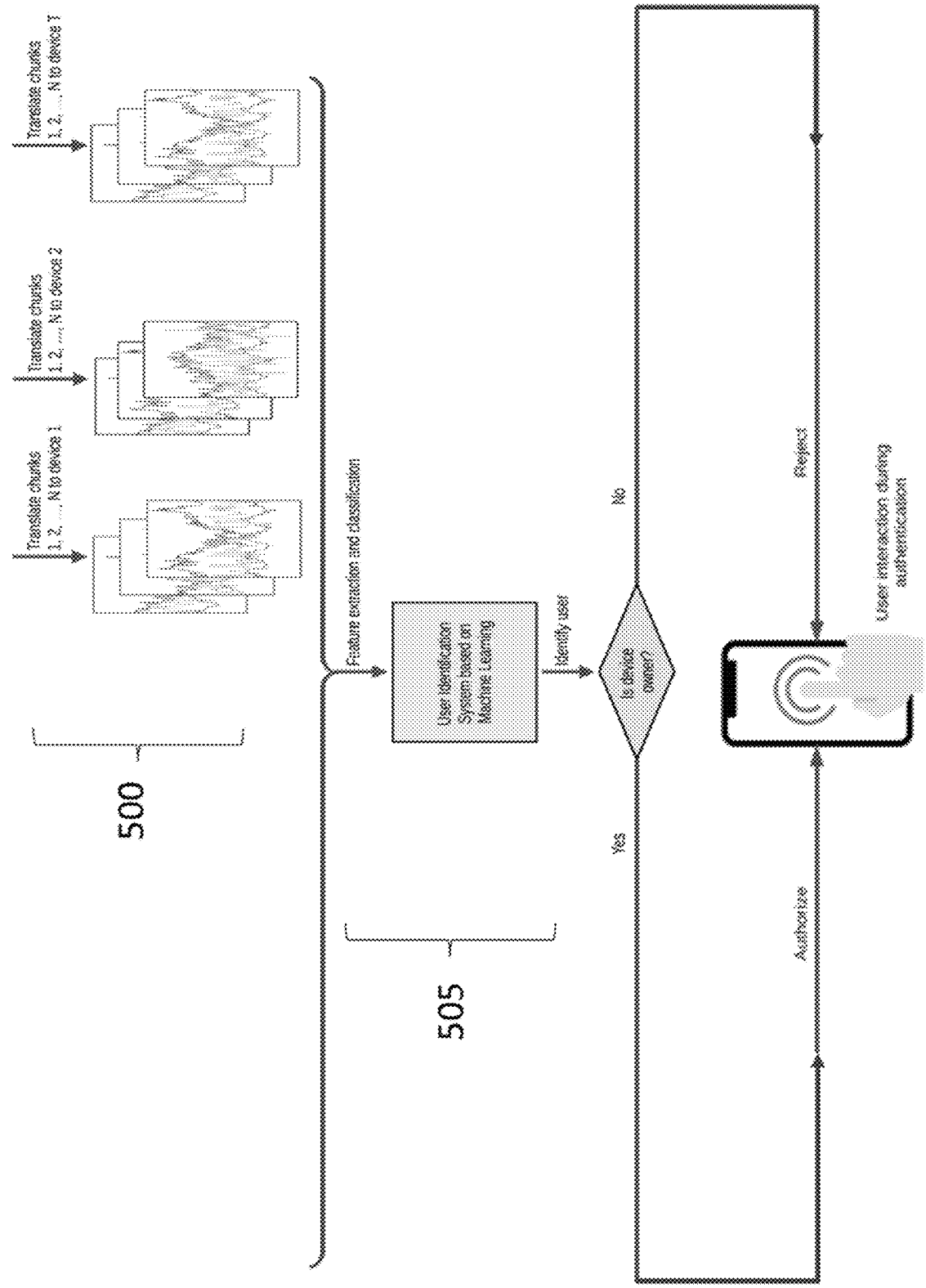

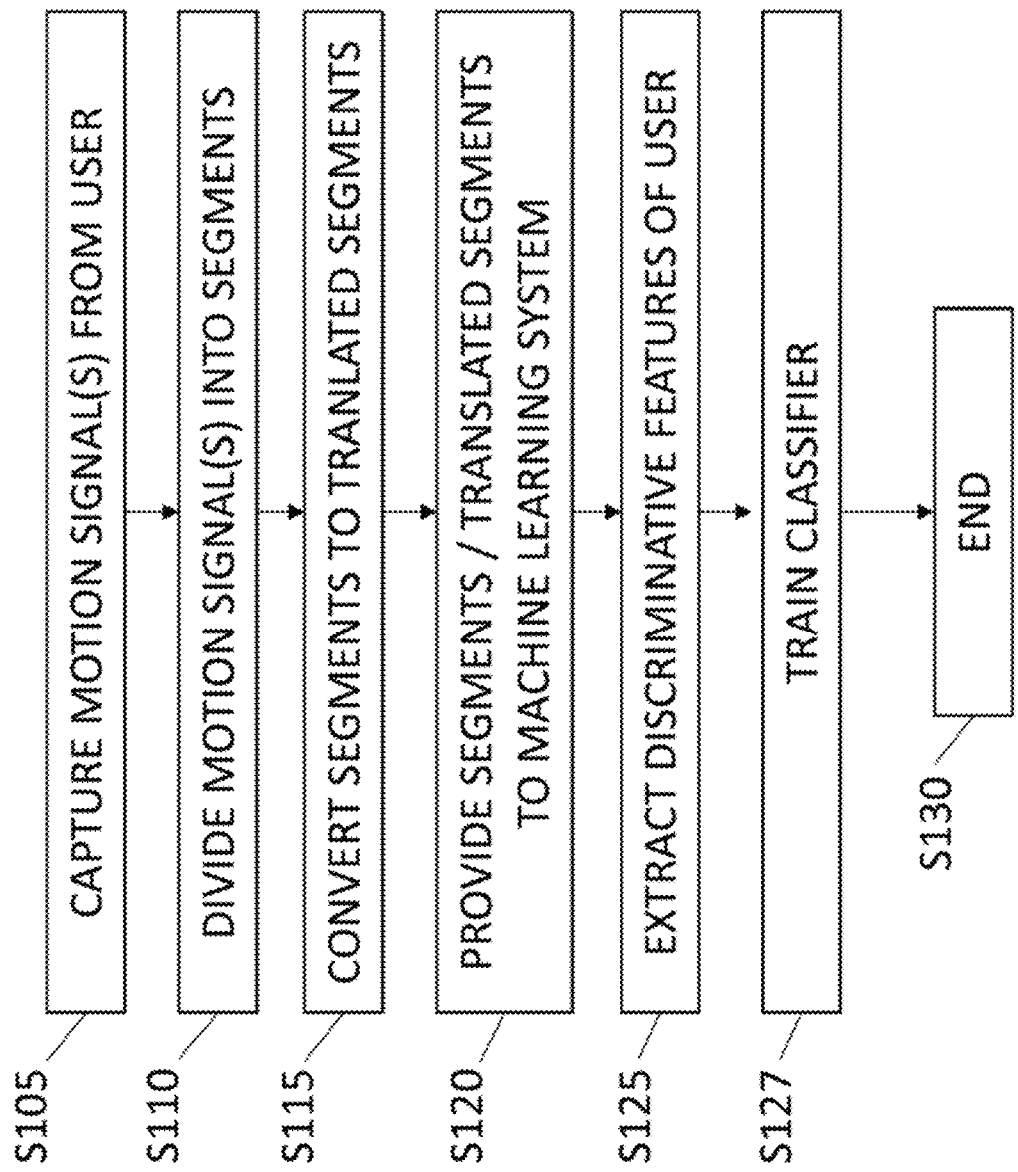

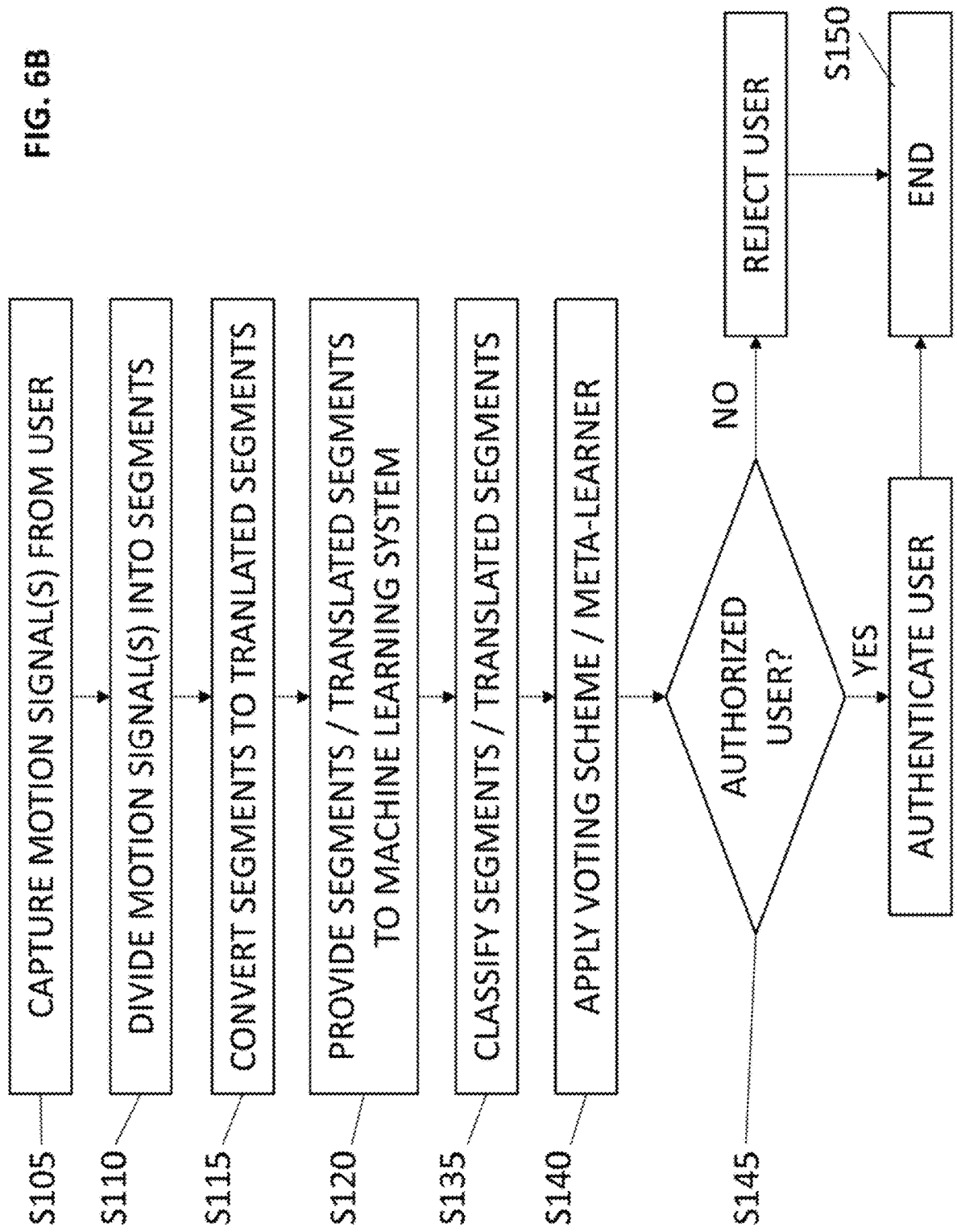

SYSTEM AND METHOD FOR DISENTANGLING FEATURES SPECIFIC TO USERS, ACTIONS AND DEVICES RECORDED IN MOTION SENSOR DATA

CROSS REFERENCE TO RELATED APPLICATIONS

The present application is based on and claims priority to U.S. Provisional Patent Application Ser. No. 62/957,653 entitled "System and Method for Disentangling Features Specific to Users, Actions and Devices Recorded in Motion Sensor Data", filed Jan. 6, 2020, the contents of which are hereby incorporated by reference as if set forth expressly in its entirety herein.

TECHNICAL FIELD

The present application relates to systems and methods for extracting features of a user, and in particular, systems and methods for extracting discriminative features of a user of a device from motion sensor data related to the user.

BACKGROUND

Standard Machine Learning (ML) systems, designed for smartphone user (owner) identification and authentication based on motion sensor data, suffer from severe performance and accuracy drops (e.g., higher than 10%) when an attacker tries to authenticate on the owner's smartphone. This problem naturally occurs when the ML system is not able to disentangle the discriminative features of the user from the discriminative features of the smartphone device or the discriminative features of the generic action (e.g., taking the phone off the table, answering a call, etc.). The problem is caused by the fact that the signals recorded by the motion sensors (e.g., accelerometer and gyroscope) during an authentication session contain all these features (representative for the user, the action and the device) together.

One approach for solving this problem is to collect additional motion signals during the user registration by: (a) asking the user to authenticate on multiple devices while performing different actions (e.g., sitting on a chair, standing, switching hands, etc.) or (b) asking the smartphone owner to let another person to make a few authentications (to simulate potential attacks). However, both these options are inconvenient for the user.

As such there is a need for a more reliable and efficient way to extract the discriminative features of a user of a mobile device.

SUMMARY

In a first aspect, a computer implemented method for disentangling discriminative features of a user of a device from motion signals captured by a mobile device is provided. The mobile device has one or more motion sensors, a storage medium, instructions stored on the storage medium, and a processor configured by executing the instructions. In the method, each captured motion signal is divided into segments, with the processor. The segments are then converted into translated segments with the processor using one or more trained translation algorithms. The segments and translated segments are then provided to a machine learning system with the processor. Discriminative features of the user are then extracted from the segments and translated segments with the processor using the machine learning system that applies one or more feature extraction algorithms.

In another aspect, the discriminative features of the user are used to identify the user upon future use of the device by the user. In another aspect, the one or more motion sensors comprise at least one of a gyroscope and an accelerometer. In another aspect, the one or more motion signals corresponds to one or more interactions between the user and the mobile device.

In another aspect, the motion signals include discriminative features of the user, discriminative features of actions performed by the user and discriminative features of the mobile device. In a further aspect, the step of dividing the one or more captured motion signals into the segments eliminates the discriminative features of actions performed by the user. In a further aspect, the step of converting the segments into the translated segments eliminates the discriminative features of the mobile device.

In another aspect, the one or more trained translation algorithms comprise one or more Cycle-consistent Generative Adversarial Networks (Cycle-GANs), and the translated segments comprise synthetic motion signals that simulate motion signals originating from another device.

In another aspect, the step of dividing the one or more captured motion signals into segments comprises dividing each motion signal into a fixed number of segments, where each segment is of a fixed length.

In a second aspect, a computer implemented method for authenticating a user on a mobile device from motion signals captured by a mobile device is provided. The mobile device has one or more motion sensors, a storage medium, instructions stored on the storage medium, and a processor configured by executing the instructions. In the method, the one or more captured motion signals are divided into segments with the processor. The segments are converted into translated segments with the processor using one or more trained translation algorithms. The segments and the translated segment are provided to a machine learning system with the processor. The segments and translated segments are then classified as belonging to an authorized user or as belonging to an unauthorized user with the processor by assigning a score to each of the segments and translated segments. A voting scheme or a meta-learning model is then applied on the scores assigned to the segments and translated segments with the processor. It is then determined, with the processor, whether the user is an authorized user based on the voting scheme or meta-learning model.

In another aspect, the step of classifying comprises: comparing the segments and translated segments to features of the authorized user extracted from sample segments provided by the authorized user during an enrollment process, where the features are stored on the storage medium; and assigning each segment with a score based on a classification model.

In another aspect, the one or more motion sensors comprise at least one of a gyroscope and an accelerometer. In another aspect, the step of dividing the one or more captured motion signals into segments comprises dividing each motion signal into a fixed number of segments, and each segment is of a fixed length. In another aspect, at least a portion of the segments are overlapping.

In another aspect, the one or more trained translation algorithms comprise one or more Cycle-GANs, and the step of converting comprises: translating the segments via a first generator into the translated segments, which mimic segments generated on another device; and re-translating the translated segments via a second generator to mimic segments generated on the mobile device.

In another aspect, the translated segments comprise synthetic motion signals that simulate motion signals originating from another device. In another aspect, the providing step comprises: extracting, with the processing using one or more feature extraction techniques, features from the segments and translated segments to form feature vectors; and employing a learned classification model on the feature vectors that correspond to the segments and the translated segments.

In a third aspect, a system for disentangling discriminative features of a user of a device from motion signals captured on a mobile device and authenticating a user on the mobile device is provided, where the mobile device has at least one motion sensor. The system includes a network communication interface, a computer-readable storage medium, and a processor configured to interact with the network communication interface and the computer readable storage medium and execute one or more software modules stored on the storage medium. The software modules include:

- a segmentation module that when executed configures the processor to divide each captured motion signal into segments;
- a conversion module that when executed configures the processor to convert the segments into translated segments using one or more trained Cycle-consistent Generative Adversarial Networks (Cycle-GANs);
- a feature extraction module that when executed configures the processor to extract extracting discriminative features of the user from the segments and translated segments, with the processor using a machine learning system;
- a classification module that when executed configures the processor to assign scores to the segments and translated segments and determine whether the segments and translated segments belong to an authorized user or an unauthorized user based on their respective scores; and
- a meta-learning module that when executed configures the processor to apply a voting scheme or a meta-learning model on the scores assigned to the segments and translated segments based on stored segments corresponding to the user.

In another aspect, the at least one motion sensor comprises at least one of a gyroscope and an accelerometer.

In another aspect, the conversion module configures the processor to translate the segments via a first generator into the translated segments, which mimic segments generated on another device and re-translate the translated segments via a second generator to mimic segments generated on the mobile device.

In another aspect, the feature extraction module is further configured to employ a learned classification model on the extracted features that correspond to the segments and the translated segments.

BRIEF DESCRIPTION OF THE DRAWINGS

FIGS. 5A-5D show a system and flow diagram for disentangling discriminative features of a user of a mobile device from motion sensor data and authenticating a user from motion sensor data, in accordance with one or more embodiments;

FIG. 6A discloses a high-level block diagram showing a computation flow for disentangling discriminative features of a user of a device from motion sensor data, in accordance with at least one embodiment disclosed herein; and FIG. 6B discloses a high-level block diagram showing a computation flow for authenticating a user on a mobile device from motion sensor data, in accordance with at least one embodiment disclosed herein.

DETAILED DESCRIPTION OF CERTAIN EMBODIMENTS

By way of overview and introduction, disclosed herein are exemplary systems and methods for extracting or disentangling the discriminative features of a smartphone user from motion signals and separating them from the features that are useful for discriminating the action and discriminating the device, without requiring the user to perform any additional authentications during registration. In accordance with one or more embodiments of the method, in a first stage, the features that discriminate the actions are eliminated by cutting down the signal into smaller chunks and by applying a Machine Learning system on each of these chunks, independently. It should be understood that the term "eliminate" does not necessarily mean that signal features relating to the action (or device) are removed from the resulting motion data signal(s). Rather, the process effectively eliminates the discriminative feature of the action by obfuscating those discriminative features through independent processing of the signal chunks. Put another way, since the system cannot reconstruct the whole signal back from the small chunks, the action of the user that corresponds to the motion signal (e.g., finger swipe, gesture) can no longer be recovered and identified and is therefore effectively eliminated. In a second stage, the features that discriminate the device are effectively eliminated by employing a generative model, e.g. Generative Adversarial Networks, to simulate authentication sessions on a predefined set of devices. The generative model is trained to take as input chunks of signals from a device and provide as output similar chunks of signals that replace the features of the input device with discriminative features for other devices in a predefined set. After infusing features from different devices into the signals of a certain user, the Machine Learning system can learn from the original signal chunks and simulated signal chunks what features do not change across devices. These are the features that are useful in discriminating the user in question.

The methods and systems described herein can be plugged into any Machine Learning system designed for smartphone user (owner) identification and authentication, for example. The described methods and systems focus on the discriminative features of the user, while eliminating the features that discriminate devices and actions. The methods and systems are validated on a set of experiments and the benefits are empirically demonstrated.

Figure 1A:
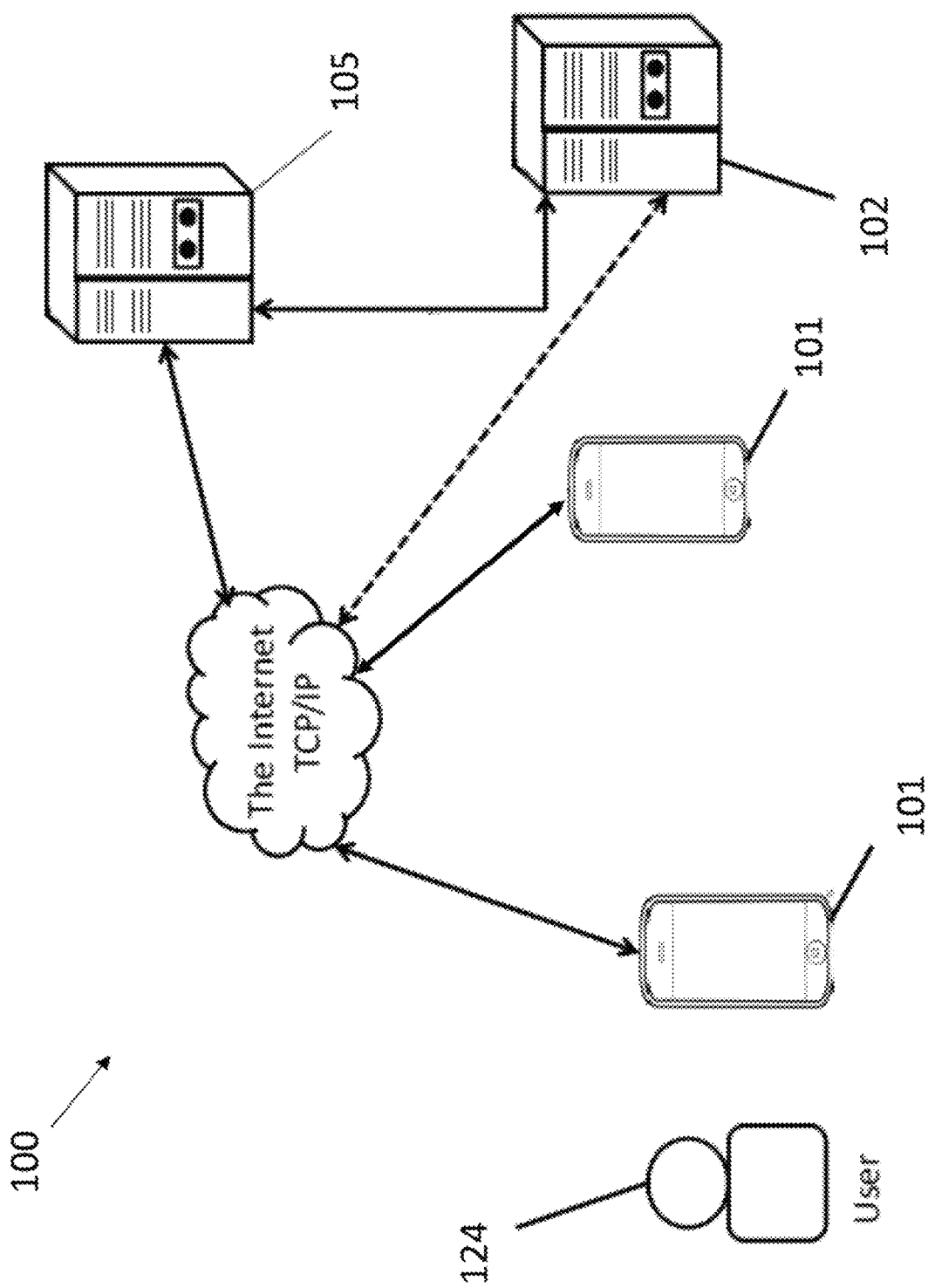
FIG. 1A discloses a high-level diagram of a system for disentangling discriminative features of a user of a device from motion sensor data and authenticating a user from motion sensor data, in accordance with at least one embodiment disclosed herein.

FIG. 1A discloses a high-level diagram of the present system 100 for disentangling discriminative features of a user of a device from motion sensor data and authenticating a user from motion sensor data in accordance with at least one embodiment. The present methods can be implemented using one or more aspects of the present system 100, as described in further detail below. In some implementations, the system 100 includes a cloud-based system server platform that communicates with fixed PCs, servers, and devices such as smartphones, tablets and laptops operated by users.

In one arrangement, the system 100 comprises a system server (back-end server) 105 and one or more user device(s) including one or more mobile device(s) 101. While the present systems and methods are generally described as being performed, in part, with a mobile device (e.g., smartphone), in at least one embodiment, the present systems and methods can be implemented on other types of computing devices, such as workstations, a personal computer, laptop computer, access control devices or other appropriate digital computers. For example, while the user-facing devices like mobile device 101 typically capture the motion signals, one or more of the exemplary processing operations directed to disentangling discriminative features of the user from the motion signal, and authentication/identification can be performed by the system server 105. The system 100 can also include one or more remote computing devices 102.

The system server 105 can be practically any computing device or data processing apparatus capable of communicating with the user devices and remote computing devices and receiving, transmitting and storing electronic information and processing requests as further described herein. Similarly, the remote computing device 102 can be practically any computing device or data processing apparatus capable of communicating with the system server or the user devices and receiving, transmitting and storing electronic information and processing requests as further described herein. It should also be understood that the system server or remote computing device can be any number of networked or cloud-based computing devices.

In one or more embodiments, the user device(s), mobile device(s) 101 can be configured to communicate with one another, the system server 105 or remote computing device 102, transmitting electronic information thereto and receiving electronic information therefrom. The user devices can be configured to capture and process motion signals from the user, for example, corresponding to one or more gestures (interactions) from a user 124.

The mobile device(s) 101 can be any mobile computing devices or data processing apparatus capable of embodying the systems and methods described herein, including but not limited to a personal computer, tablet computer, personal digital assistant, mobile electronic device, cellular telephone or smart phone device and the like.

It should be noted that while FIG. 1A depicts the system 100 for disentangling discriminative features of a user and user authentication with respect to mobile device(s) 101 and a remote computing device 102, any number of such devices can interact with the system in the manner described herein. It should also be noted that while FIG. 1A depicts a system 100 for disentangling discriminative features of a user and authentication with respect to the user 124, any number of users can interact with the system in the manner described herein.

It should be further understood that while the various computing devices and machines referenced herein, including but not limited to mobile device(s) 101 and system server 105 and remote computing device 102 are referred to herein as individual or single devices and machines, in certain implementations the referenced devices and machines, and their associated or accompanying operations, features and functionalities can be combined or arranged or otherwise employed across a number of such devices or machines, such as over a network connection or wired connection, as is known to those of skill in the art.

It should also be understood that the exemplary systems and methods described herein in the context of the mobile device(s) 101 (also referred to as a smartphone) are not specifically limited to the mobile device and can be implemented using other enabled computing devices.

Figure 1B:
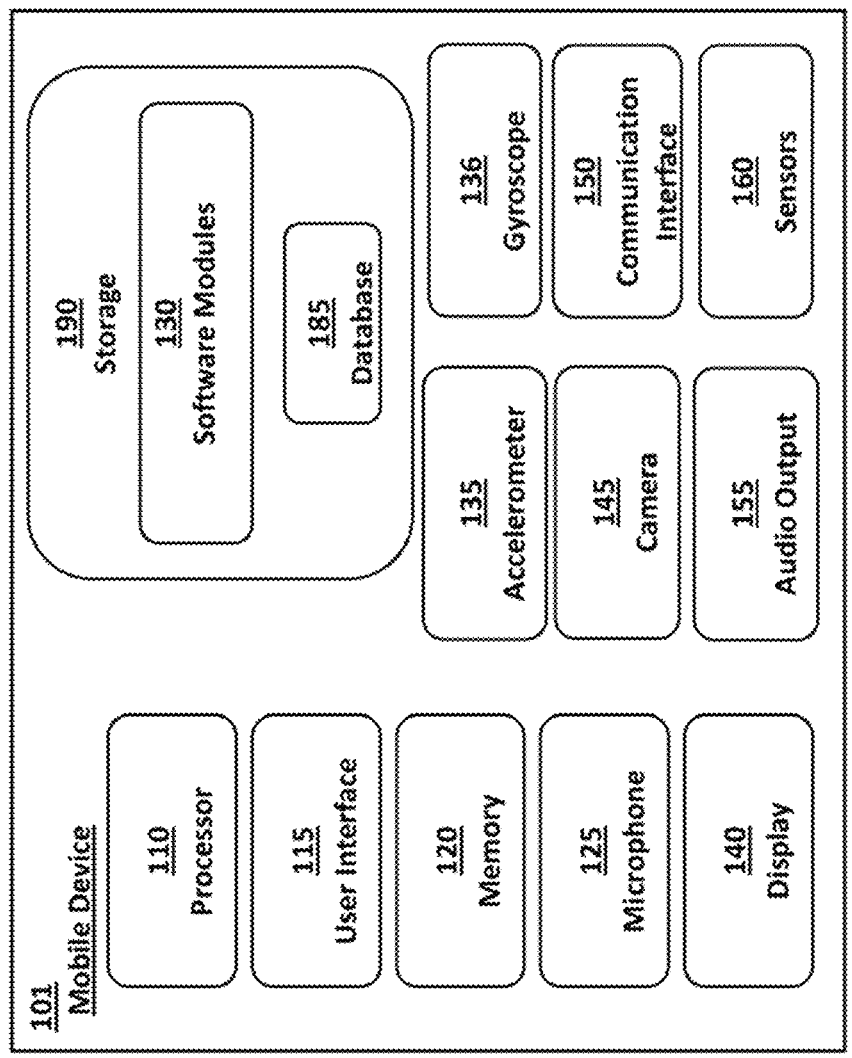
FIG. 1B is a block diagram of a computer system for disentangling discriminative features of a user of a device from motion sensor data and authenticating a user from motion sensor data, in accordance with at least one embodiment disclosed herein.

With reference now to FIG. 1B, mobile device 101 of the system 100, includes various hardware and software components that serve to enable operation of the system, including one or more processors 110, a memory 120, a microphone 125, a display 140, a camera 145, an audio output 155, a storage 190 and a communication interface 150. Processor 110 serves to execute a client application in the form of software instructions that can be loaded into memory 120. Processor 110 can be any number of processors, a central processing unit CPU, a graphics processing unit GPU, a multi-processor core, or any other type of processor, depending on the implementation.

Preferably, the memory 120 and/or the storage 190 are accessible by the processor 110, thereby enabling the processor to receive and execute instructions encoded in the memory and/or on the storage to cause the mobile device and its various hardware components to carry out operations for aspects of the systems and methods as will be described in greater detail below. Memory can be, for example, a random access memory (RAM) or any other suitable volatile or non-volatile computer readable storage medium. In addition, the memory can be fixed or removable. The storage 190 can take various forms, depending on the implementation. For example, the storage can contain one or more components or devices such as a hard drive, a flash memory, a rewritable optical disk, a rewritable magnetic tape, or some combination of the above. Storage also can be fixed or removable.

Figure 1C:
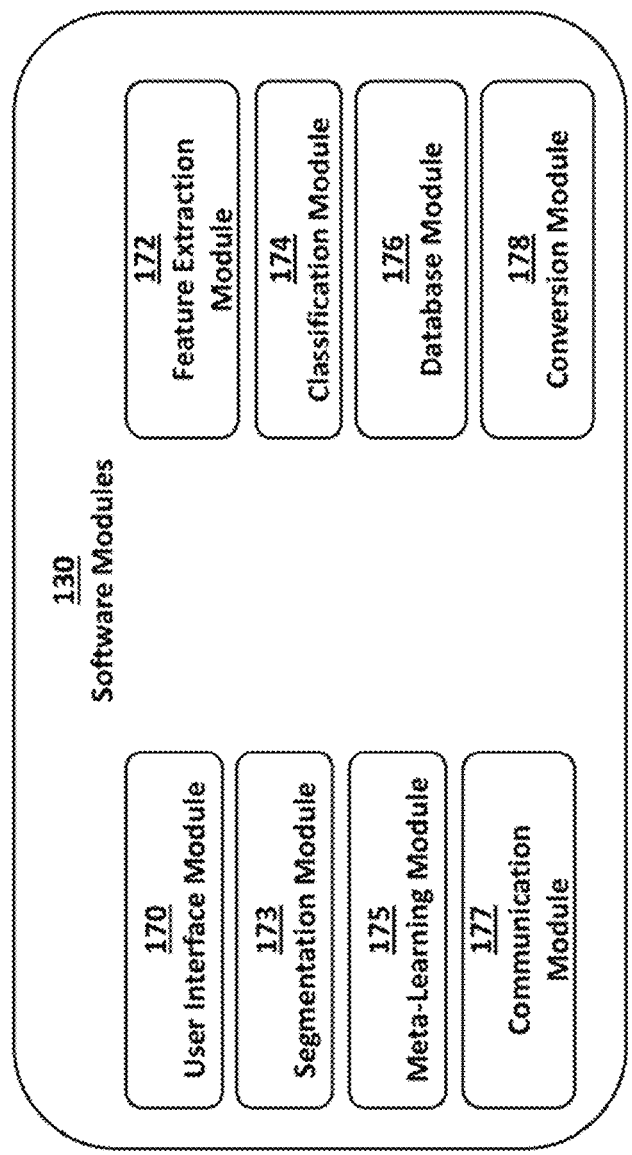
FIG. 1C is a block diagram of software modules for disentangling discriminative features of a user of a device from motion sensor data and authenticating a user from motion sensor data, in accordance with at least one embodiment disclosed herein.

One or more software modules 130 can be encoded in the storage 190 and/or in the memory 120. The software modules 130 can comprise one or more software programs or applications having computer program code, or a set of instructions executed in the processor 110. In an exemplary embodiment, as depicted in FIG. 1C, preferably, included among the software modules 130 is a user interface module 170, a feature extraction module 172, a segmentation module 173, a classification module 174, a meta-learning module 175, a database module 176, a communication module 177, and a conversion module 178 that are executed by processor 110. Such computer program code or instructions configure the processor 110 to carry out operations of the systems and methods disclosed herein and can be written in any combination of one or more programming languages.

Specifically, the user interface module 170 can comprise one or more algorithms for performing steps related to capturing motion signals from a user and authenticating the identity of the user. The feature extraction module 172 can comprise one or more features extraction algorithms (e.g., machine learning algorithms) for performing steps related to extracting discriminative features of the users from segments and translated segments of the motion signals of the user. The segmentation module 173 can comprise one more algorithms for performing steps related to dividing the captured motion signals into segments. The conversion module 178 comprises one or more translation algorithms for performing steps related to converting the segments of motion signals into translated segments. The classification module 174 comprises one or more algorithms for performing steps related to scoring (e.g., assigning class probabilities to) the segments and translated segments. The meta-learning module 175 comprises one or more algorithms (e.g., voting scheme or a meta-learning model) for performing steps related to integrating the scores assigned to the segments and translated segments so as to identify or reject the user trying to authenticate. The database module 176 comprises one or more algorithms for storing or saving data related to the motion signals, segments, or translated segments to the database 185 or storage 190. The communication module 177 comprises one or more algorithms for transmitting and receiving signals between the computing devices 101, 102, and/or 105 of the system 100.

The program code can execute entirely on mobile device 101, as a stand-alone software package, partly on mobile device, partly on system server 105, or entirely on system server or another remote computer or device. In the latter scenario, the remote computer can be connected to mobile device 101 through any type of network, including a local area network (LAN) or a wide area network (WAN), mobile communications network, cellular network, or the connection can be made to an external computer (for example, through the Internet using an Internet Service Provider).

In one or more embodiments, the program code of software modules 130 and one or more computer readable storage devices (such as memory 120 and/or storage 190) form a computer program product that can be manufactured and/or distributed in accordance with the present invention, as is known to those of ordinary skill in the art.

In some illustrative embodiments, one or more of the software modules 130 can be downloaded over a network to storage 190 from another device or system via communication interface 150 for use within the system 100. In addition, it should be noted that other information and/or data relevant to the operation of the present systems and methods (such as database 185) can also be stored on storage. Preferably, such information is stored on an encrypted data-store that is specifically allocated to securely store information collected or generated by the processor executing the secure authentication application. Preferably, encryption measures are used to store the information locally on the mobile device storage and transmit information to the system server 105. For example, such data can be encrypted using a 1024 bit polymorphic cipher, or, depending on the export controls, an AES 256 bit encryption method. Furthermore, encryption can be performed using remote key (seeds) or local keys (seeds). Alternative encryption methods can be used as would be understood by those skilled in the art, for example, SHA256.

In addition, data stored on the mobile device(s) 101 and/or system server 105 can be encrypted using a user's motion sensor data or mobile device information as an encryption key. In some implementations, a combination of the foregoing can be used to create a complex unique key for the user that can be encrypted on the mobile device using Elliptic Curve Cryptography, preferably at least 384 bits in length. In addition, that key can be used to secure the user data stored on the mobile device or the system server.

Also, in one or more embodiments, a database 185 is stored on storage 190. As will be described in greater detail below, the database 185 contains or maintains various data items and elements that are utilized throughout the various operations of the system 100 and methods for disentangling discriminative features of a user and user authentication. The information stored in database can include but is not limited to user motion sensor data templates and profile information, as will be described in greater detail herein. It should be noted that although database is depicted as being configured locally to mobile device 101, in certain implementations the database or various of the data elements stored therein can, in addition or alternatively, be located remotely (such as on a remote device 102 or system server 105—not shown) and connected to mobile device through a network in a manner known to those of ordinary skill in the art.

A user interface 115 is also operatively connected to the processor. The interface can be one or more input or output device(s) such as switch(es), button(s), key(s), a touchscreen, microphone, etc. as would be understood in the art of electronic computing devices. User interface 115 serves to facilitate the capture of commands from the user such as an on-off commands or user information and settings related to operation of the system 100 for user recognition. For example, in at least one embodiment, the interface 115 can serve to facilitate the capture of certain information from the mobile device(s) 101 such as personal user information for enrolling with the system so as to create a user profile.

The mobile device 101 can also include a display 140 which is also operatively connected to processor 110. The display includes a screen or any other such presentation device which enables the system to instruct or otherwise provide feedback to the user regarding the operations of the system 100 for disentangling discriminative features of a user and user authentication. By way of example, the display can be a digital display such as a dot matrix display or other 2-dimensional display.

By way of further example, as is common in smartphones such as mobile device 101, the interface and the display can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the person to interact with the device to enter data, change settings, control functions, etc. So, when the touch screen is touched, user interface communicates this change to processor, and settings can be changed, or user entered information can be captured and stored in the memory.

Mobile device 101 can also include a camera 145 capable of capturing digital images. The mobile device 101 or the camera 145 can also include one or more light or signal emitters (e.g., LEDs, not shown) for example, a visible light emitter or infrared light emitter and the like. The camera can be integrated into the mobile device, such as a front-facing camera or rear facing camera that incorporates a sensor, for example and without limitation a CCD or CMOS sensor. As would be understood by those skilled in the art, camera 145 can also include additional hardware such as lenses, light meters (e.g., lux meters) and other conventional hardware and software features that are useable to adjust image capture settings such as zoom, focus, aperture, exposure, shutter speed and the like. Alternatively, the camera can be external to the mobile device 101. The possible variations of the camera and light emitters would be understood by those skilled in the art. In addition, the mobile device can also include one or more microphones 125 for capturing audio recordings as would be understood by those skilled in the art.

Audio output 155 is also operatively connected to the processor 110. Audio output can be any type of speaker system that is configured to play electronic audio files as would be understood by those skilled in the art. Audio output can be integrated into the mobile device 101 or external to the mobile device 101.

Various hardware devices or sensors 160 can also be operatively connected to the processor. For example, the sensors 160 can include: an on-board clock to track time of day, etc.; a GPS enabled device to determine a location of the mobile device; Gravity magnetometer to detect the Earth's magnetic field to determine the 3-dimensional orientation of the mobile device; proximity sensors to detect a distance between the mobile device and other objects; RF radiation sensors to detect the RF radiation levels; and other such devices as would be understood by those skilled in the art.

The mobile device(s) 101 also comprises an accelerometer 135 and/or a gyroscope 136, which are configured to capture motion signals from the user 124. In at least one embodiment, the accelerometer can also be configured to track the orientation and acceleration of the mobile device. The mobile device 101 can be set (configured) to provide the accelerometer and gyroscope values to the processor 110 executing the various software modules 130, including, for example, the feature extraction module 172, classification module 174, and meta-learning module 175.

Communication interface 150 is also operatively connected to the processor 110 and can be any interface that enables communication between the mobile device 101 and external devices, machines and/or elements including system server 105. Preferably, communication interface includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the mobile device to other computing devices and/or communication networks such as private networks and the Internet. Such connections can include a wired connection or a wireless connection (e.g., using the 802.11 standard) though it should be understood that communication interface can be practically any interface that enables communication to and from the mobile device.

At various points during the operations of the system 100 for disentangling discriminative features of a user and user authentication, the mobile device 101 can communicate with one or more computing devices, such as system server 105, and/or remote computing device 102. Such computing devices transmit and/or receive data to and from mobile device 101, thereby preferably initiating, maintaining and/or enhancing the operation of the system 100, as will be described in greater detail below.

Figure 1D:
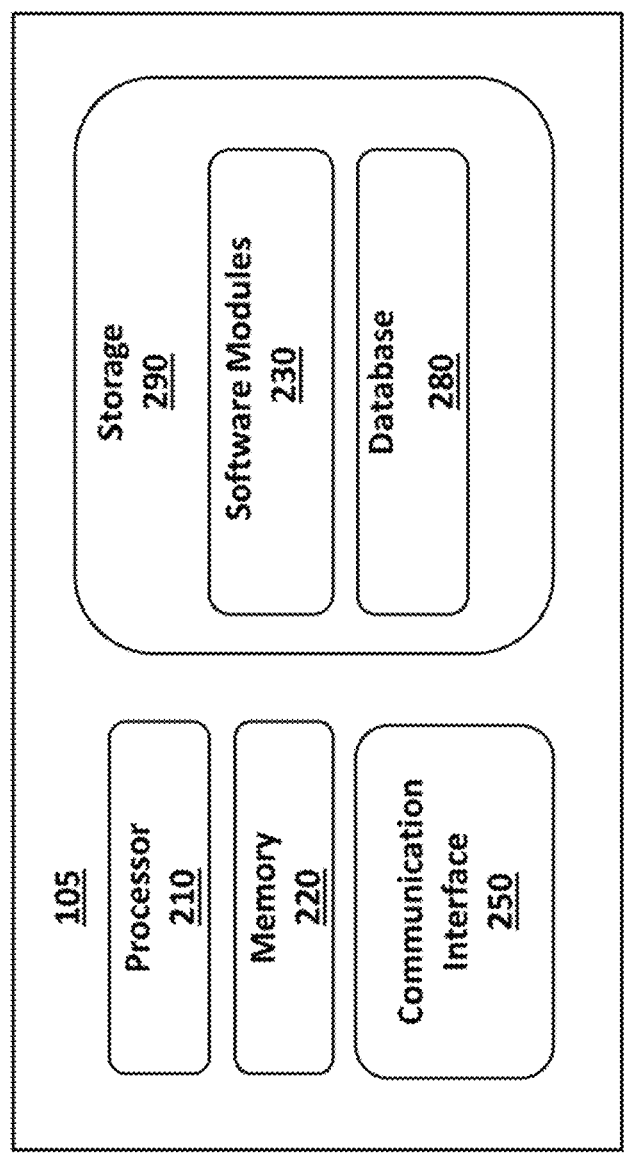
FIG. 1D is a block diagram of a computer system for disentangling discriminative features of a user of a device from motion sensor data and authenticating a user from motion sensor data, in accordance with at least one embodiment disclosed herein.

FIG. 1D is a block diagram illustrating an exemplary configuration of system server 105. System server 105 can include a processor 210 which is operatively connected to various hardware and software components that serve to enable operation of the system 100 for disentangling discriminative features of a user and user recognition. The processor 210 serves to execute instructions to perform various operations relating to user recognition as will be described in greater detail below. The processor 210 can be a number of processors, a multi-processor core, or some other type of processor, depending on the particular implementation.

In certain implementations, a memory 220 and/or a storage medium 290 are accessible by the processor 210, thereby enabling the processor 210 to receive and execute instructions stored on the memory 220 and/or on the storage 290. The memory 220 can be, for example, a random access memory (RAM) or any other suitable volatile or non-volatile computer readable storage medium. In addition, the memory 220 can be fixed or removable. The storage 290 can take various forms, depending on the particular implementation. For example, the storage 290 can contain one or more components or devices such as a hard drive, a flash memory, a rewritable optical disk, a rewritable magnetic tape, or some combination of the above. The storage 290 also can be fixed or removable.

One or more software modules 230 are encoded in the storage 290 and/or in the memory 220. One or more of the software modules 230 can comprise one or more software programs or applications having computer program code, or a set of instructions executed in the processor 210. In an embodiment, software modules 230 can comprise one or more of the software modules 130. Such computer program code or instructions for carrying out operations for aspects of the systems and methods disclosed herein can be written in any combination of one or more programming languages, as would be understood by those skilled in the art. The program code can execute entirely on the system server 105 as a stand-alone software package, partly on the system server 105 and partly on a remote computing device, such as a remote computing device 102, and/or mobile device(s) 101 or entirely on such remote computing devices. In one or more embodiments, as depicted in FIG. 1B, preferably, included among the software modules 230 are a feature extraction module 172, a segmentation module 173, a classification module 174, a meta-learning module 175 a database module 176, a communication module 177, and a conversion module 178 that can be executed by the system server's processor 210.

Also, preferably stored on the storage 290 is a database 280. As will be described in greater detail below, the database 280 contains or maintains various data items and elements that are utilized throughout the various operations of the system 100, including but not limited to, user profiles as will be described in greater detail herein. It should be noted that although the database 280 is depicted as being configured locally to the computing device 105, in certain implementations the database 280 or various of the data elements stored therein can be stored on a computer readable memory or storage medium that is located remotely and connected to the system server 105 through a network (not shown), in a manner known to those of ordinary skill in the art.

A communication interface 250 is also operatively connected to the processor 210. The communication interface 250 can be any interface that enables communication between the system server 105 and external devices, machines or elements. In certain implementations, the communication interface 250 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, or any other such interfaces for connecting the computing device 105 to other computing devices or communication networks, such as private networks and the Internet. Such connections can include a wired connection or a wireless connection (e.g., using the 802.11 standard) though it should be understood that communication interface 250 can be practically any interface that enables communication to and from the processor 210.

The operations of the system 100 and its various elements and components can be further appreciated with reference to the methods for disentangling discriminative features of a user and user authentication using motion sensor data as described below with reference to FIGS. 2, 3, 4, 5A-5D, 6A-6B, for example. The processes depicted herein are shown from the perspective of the mobile device 101 and/or the system server 105, however, it should be understood that the processes can be performed, in whole or in part, by the mobile device(s) 101, the system server 105 and/or other computing devices (e.g., remote computing device 102) or any combination of the foregoing. It should be appreciated that more or fewer operations can be performed than shown in the figures and described herein. These operations can also be performed in a different order than those described herein. It should also be understood that one or more of the steps can be performed by the mobile device 101 and/or on other computing devices (e.g., system server 105 and remote computing device 102).

Several User Behavior Authentication (UBA) systems for smartphone users based on motion sensors have been proposed in the recent literature. Modern systems obtaining top-level accuracy rates, rely on Machine Learning (ML) and Deep Learning principles to learn discriminative models, e.g. "N. Neverova, C. Wolf G. Lacey, L. Fridman, D. Chandra, B. Barbello, G. Taylor. *Learning Human Identity from Motion Patterns*. IEEE Access, vol. 4, pp. 1810-1820, 2016". However, such models are evaluated on data sets collected from smartphone users, having one user (the legitimate owner) per device.

Figure 2:
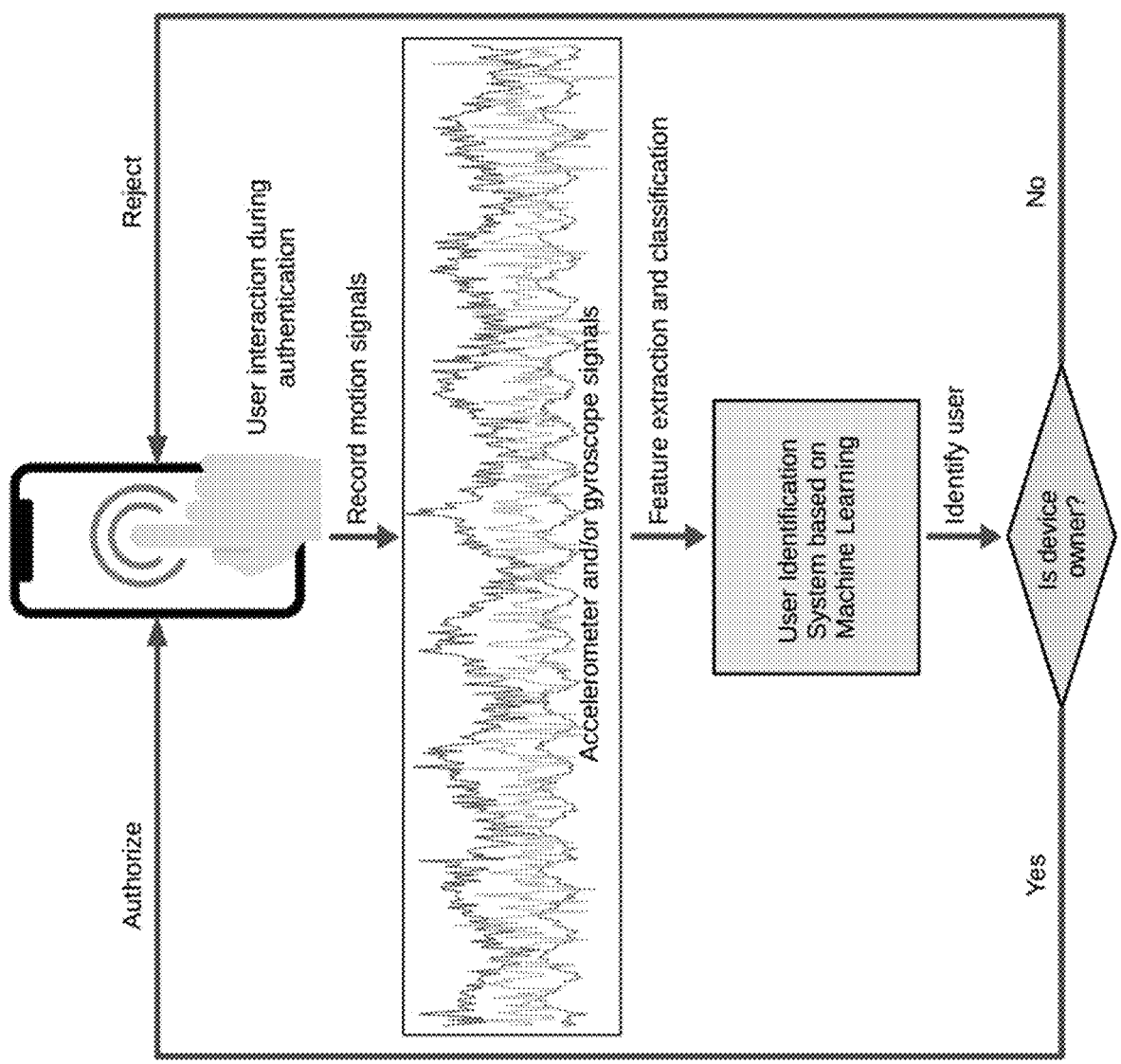
FIG. 2 is a diagram showing an exemplary standard smartphone user identification system and flow diagram based on Machine Learning, in accordance with one or more embodiments.

FIG. 2 displays a hybrid system and process flow diagram showing a standard smartphone user identification system based on Machine Learning in accordance with one or more embodiments. Specifically, FIG. 2 displays an execution flow of a typical UBA system 300 that can be implemented using smartphones. As shown in FIG. 2, in a typical UBA system 300, accelerometer or gyroscope signals are recorded during each authentication or registration session. The signals are then provided as input to a Machine Learning system. The system 300 extracts features and learns a model on a set of training samples collected during user registration. During user authentication, the trained model classifies the signals either as belonging to the owner (authorizing the session) or as belonging to a different user (rejecting the session). Specific exemplary steps of the UBA system 300 are shown below:

1. During user registration or authentication, capture the signals from the built-in sensors such as accelerometer and gyroscope.
2. Inside the ML system, extract relevant features from the signals, employing a set of feature extraction techniques.
3. During registration, inside the ML system, train a classification model on the feature vectors that correspond to the signals recorded during user registration.
4. During authentication, inside the ML system, employ the learned classification model on the corresponding feature vector to distinguish the legitimate user (smartphone owner) from potential attackers.

In this setting, the decision boundary of ML systems can be influenced by the discriminative features of the device or the action rather than by the discriminative features of the user. Experiments were conducted to test this hypothesis. The empirical results indicate that it is actually more facile to rely on features that correspond to devices than features that correspond to users. This issue has not been pointed out or addressed in previous literature. However, this issue becomes problematic when attackers can get their hands on a smartphone owned by a legitimate user and they try to authenticate into an application that is protected by a UBA system. Furthermore, the attackers could impersonate the legitimate user after a thorough analysis and imitation of the movements performed during authentication. If the ML system relies on the more prominent features characterizing the device or the actions, it is likely to grant access to the attacker into the application. Hence, the ML system will have an increased false positive rate and will not be able to reject such attacks.

In order to solve this problem, the system 300 could be configured to ask the user to authenticate on multiple devices, using different movements (e.g., authenticate with left hand, right hand, while sitting, standing, etc.), and, in order to obtain negative samples from the same device, the system 300 could prompt the user to let somebody else do several authentication sessions on his own device. However, all these are impractical solutions leading to a cumbersome registration process.

Accordingly, provided herein are methods and systems that provide a practical two-stage solution to the problem intrinsic to UBA systems based on motion sensors, namely, by disentangling the discriminative features of the user from the discriminative features of the device and the action. In one or more embodiments of the present application, the disclosed methods are composed of the following two primary processing stages:

1. In order to eliminate the features that discriminate the movement or action of the user (e.g., finger swipe, gesture), the motion signals are cut into very small chunks and a ML system is applied on each of the individual chunks. Since the whole signal cannot be reconstructed back from these chunks, the movements (generic actions performed by the user) can no longer be identified. However, these small chunks of the original signal still contain discriminative features for the user and the device.
2. In order to eliminate the features that discriminate the device, a set of translation algorithms (e.g., generative models such as Cycle-consistent Generative Adversarial Networks, for short Cycle-GANs) are applied, in order to simulate authentication sessions on a predefined set of devices. The generative models are trained to take chunks of signals as input and provide as output similar chunks that include features of the devices from our predefined set. After infusing features from different devices into the signals of a certain user, the ML system can learn what features do not change across devices. These are the features that help in discriminating the respective user.

By using one or more translation algorithms, such as Cycle-GANs, in the second stage, smartphone-to-smartphone user behavior translation is achieved which helps to mask the features that describe the smartphone sensors and reveal those that shape out the user behavior. A positive consequence of clarifying the legitimate user behavior is that the UBA system becomes more vigilant and is harder to be spoofed, i.e., the false positive rate is decreased. In one or more embodiments, the disclosed systems (e.g., system 100) and methods provide an enhanced UBA system or can alternatively be incorporated into a conventional UBA system to enhance the existing UBA system.

Conventionally, common mobile device authentication mechanisms such as PINs, graphical passwords, and fingerprint scans offer limited security. These mechanisms are susceptible to guessing (or spoofing in the case of fingerprint scans) and to side channel attacks such as smudge, reflection, and video capture attacks. As a result, the continuous authentication methods based on behavioral biometric signals are in the spotlight for both academic and industrial fields.

The first research article which analyzes the accelerometer data in order to recognize the gait of a mobile device user is "E. Vildjiounaite, S.-M. Makela, M. Lindholm, R. Riihimaki, V. Kyllonen, J. Mantyjarvi, H. Ailisto. *Unobtrusive multimodal biometrics for ensuring privacy and information security with personal devices. In: Proceedings of International Conference on Pervasive Computing,* 2006".

Since then, a variety of UBA systems have been proposed by the research community, such as: "N. Clarke, S. Furnell. *Advanced user authentication for mobile devices. Computers & Security,* vol. 26, no. 2, 2007" and "P. Campisi, E. Maiorana, M. Lo Bosco, A. Neri. *User authentication using keystroke dynamics for cellular phones. Signal Processing, IET,* vol 0.3, no. 4, 2009", focusing on keystroke dynamics, and "C. Shen, T. Yu, S. Yuan, S., E Li, X. Guan. *Performance analysis of motion-sensor behavior for user authentication on smartphones. Sensors,* vol. 16, no. 3, pp. 345-365, 2016", "A. Buriro, B. Crispo, F. Del Frafi, K. Wrona. *Hold & Sign: A Novel Behavioral Biometrics for Smartphone User Authentication. In: Proceedings of Security and Privacy Workshops,* 2016", "G. Canfora, P. di Notte F. Mercaldo, C. A. Visaggio. *A Methodology for Silent and Continuous Authentication in Mobile Environment. In: Proceedings of International Conference on E-Business and Telecommunications,* pp. 241-265, 2016", "N. Neverova, C. Wolf G. Lacey, L. Fridman, D. Chandra, B. Barbello, G. Taylor. *Learning Human Identity from Motion Patterns. IEEE Access,* vol. 4, pp. 1810-1820, 2016", focusing on Machine or Deep Learning techniques.

The methods presented in the research literature or patents do not address the problem of motion signals containing features specific to users, actions and devices altogether. High performance levels have been reported in the recent works, when users perform authentications, each on their own device. In this setting, it is unclear if the high-level accuracy rates of machine learning models are due to the capability of the models to discriminate between users or between devices. This problem occurs because each user authenticates on his own device, and the devices are not shared among users.

Experiments conducted with a set of users performing authentications on a set of devices, such that each user gets to authenticate on each device, reveal that it is actually easier to discriminate between devices (accuracy is around 98%) than discriminating between users (accuracy is around 93%). This suggests that UBA systems presented in the research literature and patents are more likely to perform well because they rely on features specific to the devices rather than features specific to the users. Such systems are prone to a high false positive rate (attackers are authorized into the system), when attackers perform authentications on a device stolen from the owner.

Since this problem has not been discussed in literature, at least in the context of user identification based on motion signals for smartphone sensors, the disclosed systems and methods are the first to address the task of disentangling the features specific to users, actions and devices. In at least one embodiment, the method comprises one or more of two stages/approaches, one that disentangles the features specific to users and devices from the features specific to actions, and one that disentangles the features specific to users from those specific to devices.

The latter approach is inspired by recent research in image style transfer based on Generative Adversarial Networks. In "I. Goodfellow, J. Pouget-Abadie, M. Mirza, B. Xu, D. Warde-Farley, S. Ozair, A. Courville, E Bengio. *Generative Adversarial Nets. In: Proceedings of Advances in Neural Information Processing Systems,* pp. 2672-2680, 2014", the authors introduced Generative Adversarial Networks (GANs), a model composed of two neural networks, a generator and a discriminator, which generate new (realistic) images by learning the distribution of training samples through the minimization of the Kullback-Leibler divergence. Several other GAN-based approaches were proposed for mapping the distribution of a source set of images to a target set of images, i.e., performing style transfer. For example, methods such as "J. Y. Zhu, T. Park, P. Isola, A. A. Efros. *Unpaired image-to-image translation using cycle-consistent adversarial networks. In: Proceedings of IEEE International Conference on Computer Vision,* pp. 2223-2232, 2017" and "J. Kim, M. Kim, H. Kang, K. Lee. *U-GAT-IT: Unsupervised generative attentional networks with adaptive layer-instance normalization for image-to-image translation. arXiv preprint arXiv:*1907.10830, 2019" add a cycle-consistency loss between the target and source distributions. However, these existing methods are specific to image style transfer.

In one or more embodiments of the present application, deep generative neural networks are adapted to motion signal data by focusing on transferring features from motion sensor data signals to signals, in the time domain. More specifically, the convolutional layers and the pooling layers that are central components of deep generative neural networks are modified to perform the convolutional and pooling operations, respectively, only in the time domain. Additionally, in at least one embodiment, cycle-consistent GANs are employed to transfer signals in a multi-domain setup (e.g., multi-device setting that can comprise 3 or more devices). By contrast, existing GANs operate in the image domain, and are applied to transfer style between only two domains (e.g., between natural images and paintings).

In accordance with one or more embodiments, and as mentioned above, in order to disentangle the discriminative features of the user from the discriminative features of the device and the action, a two-stage method is provided.

The first stage is essentially based on preprocessing the signals, before giving them as input to the ML system. The preprocessing consists in dividing the signal into several chunks. The number of chunks, their length, as well as the interval used for selecting the chunks are parameters of the proposed preprocessing stage, and they can have a direct impact on accuracy and time. For example, a fixed number of chunks and a fixed length for each chunk are set. In this case, the interval for extracting chunks is computed from a signal by taking into consideration the signal length. Faster authentications will produce shorter signals and chunks might get overlapped, while slower authentications will produce longer signals and chunks might not cover the entire signal (some parts will be lost). Another example is to fix the interval and the signal lengths, obtaining a different number of chunks depending on the input signals length. Yet another example is to fix the number of chunks and compute the intervals and corresponding lengths in order to cover the entire input signals. All the exemplified cases (and further similar cases) are covered by the preprocessing approach of the present application performed by the disclosed systems. The resulting chunks are further subject to the feature extraction and classification pipeline of an exemplary UBA system, as illustrated in FIG. 3.

Figure 3:
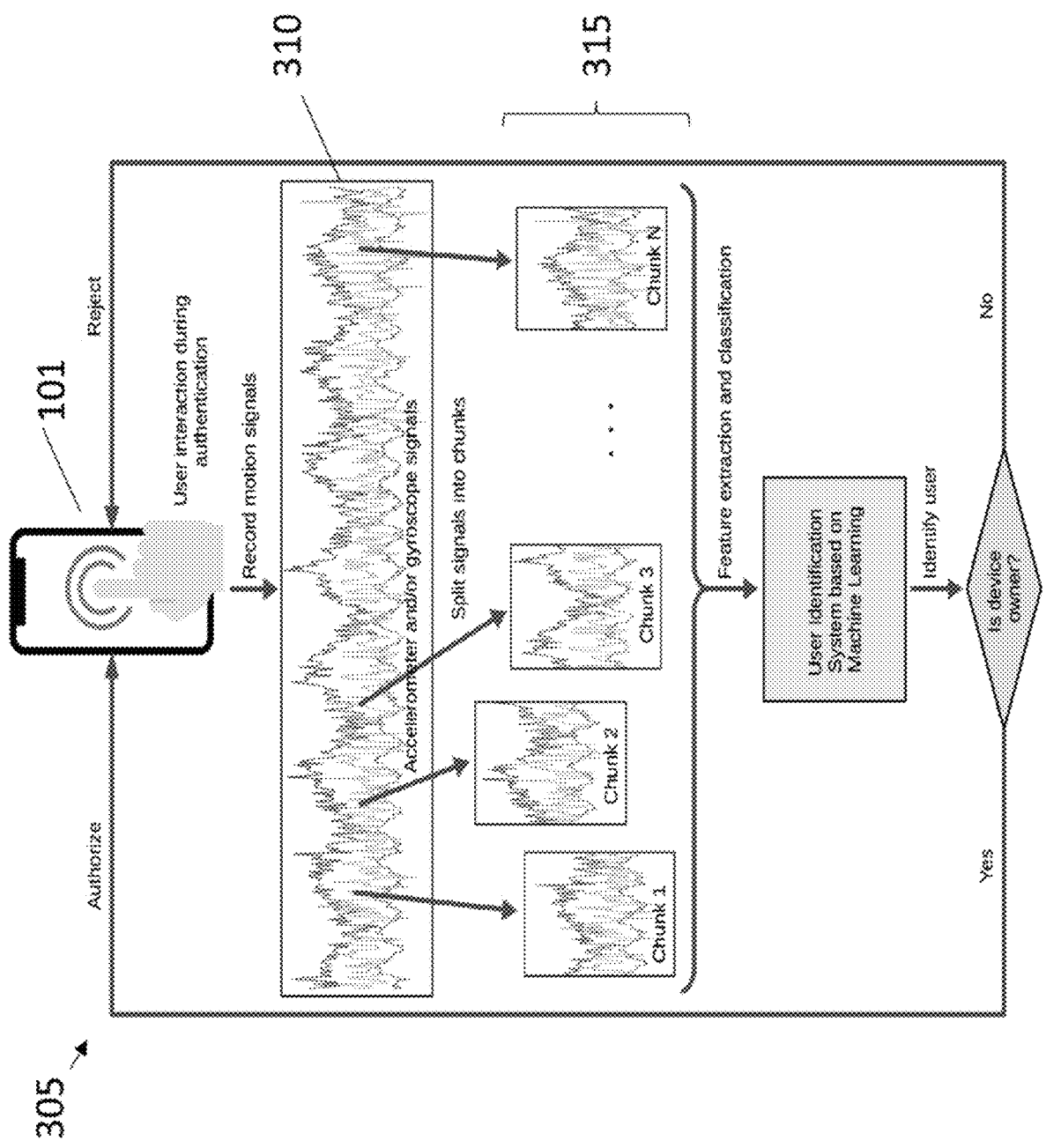
FIG. 3 is a diagram shown an exemplary mobile device system and flow diagram for user identification by removing features discriminative of the action based on Machine Learning, in accordance with one or more embodiments.

FIG. 3 displays a diagram showing an exemplary mobile device system and process flow diagram 305 for user identification by removing features discriminative of the action, based on Machine Learning, in accordance with one or more embodiments. In an embodiment, the process can be implemented using one or more elements of the system 100 (e.g., the mobile device 100, alone, or in conjunction with the system server 105). As shown in FIG. 3, accelerometer or gyroscope signals (motion signals) 310 are recorded by the mobile device 101 during each authentication session. The signals 310 are then divided by the system (e.g., the processor of the mobile device 100 and/or system server 105) into N smaller (potentially overlapping) chunks or segments 315. The chunks 315 are considered as individual samples and are provided as input to a Machine Learning system. The Machine Learning system then extracts features and learns a model on a set of training samples collected during user registration. During user authentication, the Machine Learning system classifies the chunks 315 either as belonging to the owner or as belonging to a different user. A meta-learning approach or a (weighted) majority vote on the labels or scores assigned to the chunks (extracted from a signal recorded during an authentication session) can be applied to authorize or reject the session.

The exemplary systems and methods disclosed herein can be implemented using motion sensor data captured during implicit and/or explicit authentication sessions. Explicit authentication refers to an authentication session in which the user is prompted to perform a prescribed action using the mobile device. By contrast, implicit authentication refers to a user authentication session that is performed without explicitly prompting a user to perform any action. The goal of dividing the motion signals 310 into chunks 315, i.e., applying the preprocessing described above, is to eliminate the features discriminative of the action. During explicit or implicit authentication, the user can perform different actions, although explicit authentications can exhibit lower variability. Indeed, in explicit authentication sessions, the user is likely to always perform the same steps, e.g., scan a QR code, point the smartphone towards the face, place a finger on the fingerprint scanner, etc. However, these steps can be performed using one hand (left or right) or two hands, the user can perform them while sitting on a chair, standing or walking. In each of these cases, the recorded motion signals will be different. A problem can appear if the user performs the authentication steps with one hand during registration and the other hand during authentication, since the trained ML model will not generalize well to such changes. In this situation, a conventional system will reject the legitimate user, thus having a high false negative rate. The same situation is more prevalent in implicit user authentication, i.e., while the user interacts with some data sensitive application, e.g., a banking application. In this setting, not only the way the hands move or the user pose, for example, can be different, but also the actions performed by the user (tap gestures on different locations on screen, swipe gestures in different directions, etc.). The most direct way to separate (classify) such actions is to look at the changes in the motion signals over time, from the beginning of the recording to the end. The goal here, however, is to eliminate the capability of the system to separate actions. If the motion signals 310 are separated into small chunks 315, that are treated independently, as is the approach implemented by one or more embodiments of the disclosed system for disentangling discriminative features of a smartphone user from motion signals, the ML system will no longer have the chance to look at the entire recorded signal as a whole. By not knowing which chunk goes where, the ML system will not be able to recognize the action, which is only identifiable by looking at the entire recording. This happens because putting the chunks back together in a different order will correspond to a different action. It was observed that the signal preprocessing stage of the present methods improves the recognition accuracy by 4%, when users perform a set of actions while training the ML system, and a different set of actions during testing. Since the ML system makes a decision (e.g., generates a label or calculates a score) for each chunk, a voting scheme or a meta-learning model can be applied by the system on the set of decisions (labels or scores) corresponding to an authentication in order to determine if the user performing the authentication is legitimate or not.

It is well known that hardware sensors can be easily identified by looking at the output produced by these sensors, due to built-in defects, as detailed in "N. Khanna, A. K. Mikkilineni, A. F. Martone, G. N. Ali, G. T. C. Chiu, J. P. Allebach, E. J. Delp. *A survey of forensic characterization methods for physical devices. Digital Investigation*, vol. 3, pp. 17-28, 2006". For example, in "K. R. Akshatha, A. K. Karunakar, H. Anitha, U. Raghavendra, D. Shetty. *Digital camera identification using PRNU: A feature based approach. Digital Investigation*, vol. 19, pp. 69-77, 2016", the authors describe a method to identify a smartphone camera by analyzing captured photos, while in "A. Ferreira, L. C. Navarro, G. Pinheiro, J. A. dos Santos, A. Rocha. *Laser printer attribution: Exploring new features and beyond. Forensic Science International*, vol. 247, pp. 105-125, 2015", the authors present an approach to identify a laser printing device by analyzing the printed pages. In a similar way, the accelerometer and the gyroscope sensors can be uniquely identified by analyzing the produced motion signals. This means that motion signals recorded during user registration and authentication will inherently contain discriminative features of the device. Based on data from previous systems, it has been determined that it is far easier to identify the smartphone based on the recorded motion signals (accuracy is 98%), than to identify the users (accuracy is 93%) or the actions (accuracy is 92%).

While dividing the signals into chunks eliminates the features discriminative for the action, it does not alleviate the problem caused by the features discriminative for the device. The main problem is that the discriminative features of the device and the discriminative features of the user (smartphone owner) are entangled together inside the motion signals recorded during user registration and inside the chunks resulted after our preprocessing step.

According to a further salient aspect, the systems and methods for disentangling the discriminative features of a smartphone user from motion signals disclosed herein provide a solution to this problem that does not require the user (smartphone owner) to perform additional steps beside standard registration using a single device. The disclosed methods and systems for disentangling discriminative features of a user of a device from motion sensor data and authenticating a user from motion sensor data are inspired, in part, by the success of Cycle-consistent Generative Adversarial Networks in image-to-image translation with style transfer. As shown in "J. Y. Zhu, T. Park, P. Isola, A. A. Efros. *Unpaired image-to-image translation using cycle-consistent adversarial networks. In: Proceedings of IEEE International Conference on Computer Vision*, pp. 2223-2232, 2017", a Cycle-GAN can replace the style of an image with a different style, while keeping its content. In a similar way, the disclosed systems and methods replace the device used to record a motion signal with a different device, while keeping the discriminative features of the user. However, as noted above, existing methods were specific to image style transfer, whereas the approach disclosed herein is specifically directed to transferring features from a particular device's motion sensor data signals to signals simulated for another device, in the time domain.

Figure 4:
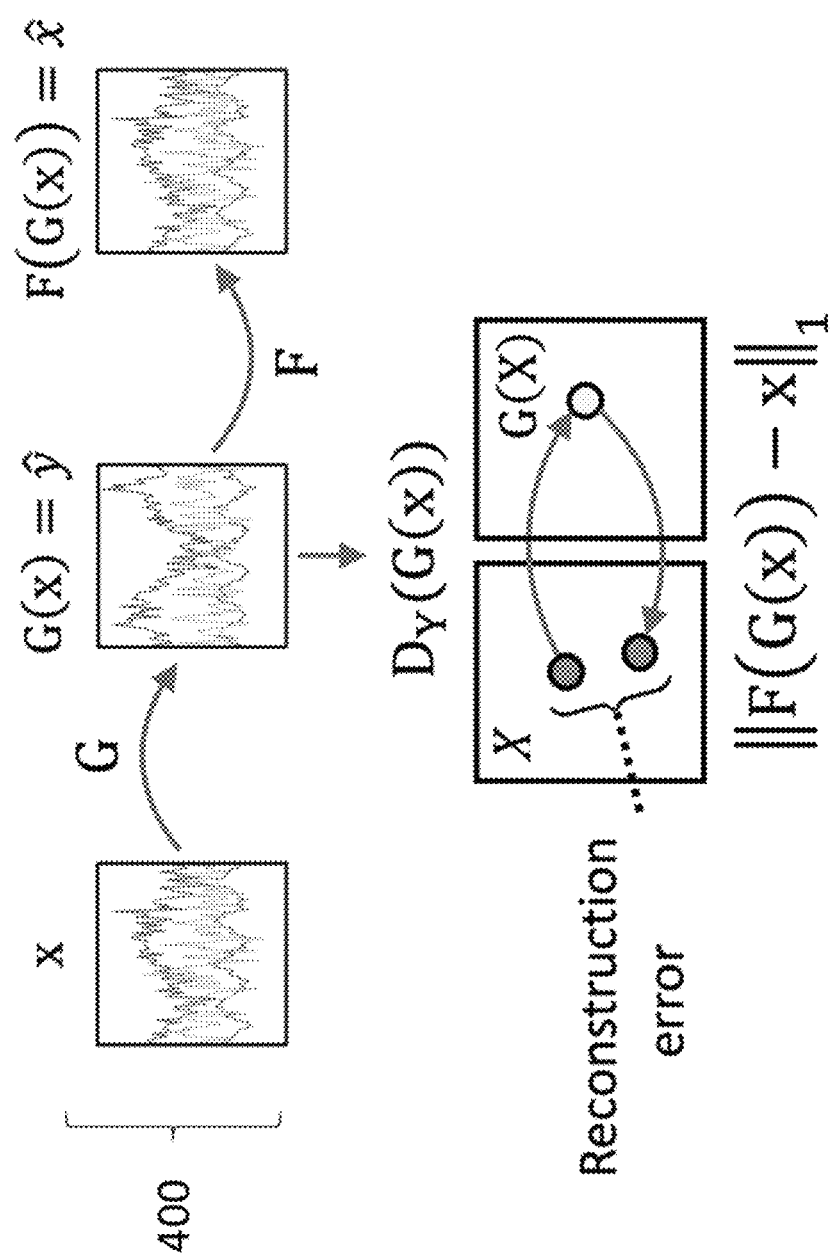
FIG. 4 is a diagram of an exemplary Cycle-consistent Generative Adversarial Network (Cycle-GAN) for signal-to-signal translation, in accordance with one or more embodiments.

Accordingly, in one or more embodiments, at least one translation algorithm, such as a Cycle-GAN, is implemented by the system 100 for signal-to-signal translation, as illustrated in FIG. 4. Specifically, FIG. 4 is a diagram of an exemplary Cycle-consistent Generative Adversarial Network (Cycle-GAN) 400 for signal-to-signal translation in accordance with one or more embodiments. As shown in FIG. 4 and in accordance with at least one embodiment, an input signal x, recorded on a device X, is translated using the generator G, to make it seem as if it was recorded on a different device Y. The signal is translated back to the original device X using the generator F. A discriminator $D_Y$ discriminates between signals recorded on the device Y and the signals generated by G. The generator G is optimized to fool the discriminator $D_Y$, while the discriminator $D_Y$ is optimized to separate the samples, in an adversarial fashion. In addition, the Generative Adversarial Network (formed of generators G and F and discriminator $D_Y$) is optimized to reduce the reconstruction error computed after translating the signal x back to the original device X. In at least one embodiment, the optimization is performed using stochastic gradient descent (or one of its many variants), an algorithm that is commonly used to optimize neural networks, as would be understood by those skilled in the art. The gradients are computed with respect to a loss function and back-propagated through the neural network using the chain rule, as would be understood by those skilled in the art. In one or more embodiments, the optimization of neural networks can be performed using evolutionary algorithms. However, it should be understood that the disclosed methods are not limited to optimization by gradient descent or evolutionary algorithms.

Adding the reconstruction error to the overall loss function ensures the cycle-consistency. In addition to translating from device X to device Y, the Cycle-GAN is simultaneously trained to transfer from device Y to device X. Hence, in the end, the disclosed systems and methods translate the signals in both directions. In one or more embodiments, the loss function used to train the Cycle-GAN for signal-to-signal translation in both directions is:

$$\mathcal{L}_{Cycle\text{-}GAN}(G,F,D_X,D_Y,x,y) = \mathcal{L}_{GAN}(G,D_Y,x,y) + \mathcal{L}_{GAN}(F,D_X,x,y) + \lambda \cdot \mathcal{L}_{cycle}(G,F,x,y),$$

where:

G and F are generators;

$D_X$ and $D_Y$ are discriminators;

x and y are motion signals (chunks) from device X and device Y, respectively;

λ is parameter that controls the importance of cycle-consistency with respect to the GAN loss;

$\mathcal{L}_{GAN}(G,D_Y,x,y) = E_{y \sim P_{data}(y)}[\log(D_Y(y))] + E_{x \sim P_{data}(x)}[\log(1-D_Y(G(x)))]$ is the cross-entropy loss that corresponds to the translation from device X to device Y, where $E[\blacksquare]$ is the expect value and $P_{data}(\blacksquare)$ is the probability distribution of data samples;

$\mathcal{L}_{GAN}(F,D_X,x,y) = E_{x \sim P_{data}(x)}[\log(D_X(x))] + E_{y \sim P_{data}(y)}[\log(1-D_X(F(y)))]$ is the cross-entropy loss that corresponds to the translation from device Y to device X;

$\mathcal{L}_{cycle}(G,F,x,y) = E_{x \sim P_{data}(x)}[\|F(G(x))-x\|^1] + E_{y \sim P_{data}(y)}[\|G(F(y))-y\|^1]$ is the sum of cycle-consistency losses for both translations, where $\|\blacksquare\|^1$ is the $l_1$ norm.

In addition to or alternatively to the Cycle GAN, the U-GAT-IT model introduced in "J. Kim, M. Kim, H. Kang, K. Lee. *U-GAT-IT: Unsupervised generative attentional networks with adaptive layer-instance normalization for image-to-image translation. arXiv preprint arXiv:* 1907.10830, 2019" can be incorporated into the present systems and methods for signal-to-signal translation. The U-GAT-IT model incorporates attention modules, both in the generator and discriminator, and a normalization function (Adaptive Layer-Instance Normalization), with the purpose of improving the translation from the source domain to the target domain. The attention maps are obtained with an auxiliary classifier, while the parameters of the normalization function are learned during training. In at least one embodiments, the loss function used to train U-GAT-IT is:

$$\mathcal{L}_{U\text{-}GAT\text{-}IT}(G,F,D_X,D_Y,x,y) = \lambda_1 \cdot (\mathcal{L}_{GAN}(G,D_Y,x,y) + \mathcal{L}_{GAN}(F,D_X,x,y)) + \lambda_2 \cdot \mathcal{L}_{cycle}(G,F,x,y) + \lambda_3 \cdot \mathcal{L}_{identity}(G,F,x,y) + \lambda_4 \cdot \mathcal{L}_{CAM}(G,F,D_X,D_Y,x,y)$$

where:

G and F are generators;

$D_X$ and $D_Y$ are discriminators;

x and y are motion signals (chunks) from device X and device Y, respectively;

$\lambda_1, \lambda_2, \lambda_3$ and $\lambda_4$ are parameters that control the importance of the various loss components;

$\mathcal{L}_{GAN}(G,D_Y,x,y) = E_{y \sim P_{data}(y)}[(D_Y(y))^2] + E_{x \sim P_{data}(x)}[(1-D_Y(G(x)))^2]$ is the least squares loss that corresponds to the translation from device X to device Y;

$\mathcal{L}_{GAN}(F,D_X,x,y) = E_{x \sim P_{data}(x)}[(D_X(x))^2] + E_{y \sim P_{data}(y)}[(1-D_X(F(y)))^2]$ is the least squares loss that corresponds to the translation from device Y to device X;

$\mathcal{L}_{cycle}(G,F,x,y) = E_{x \sim P_{data}(x)}[\|F(G(x))-x\|^1] + E_{y \sim P_{data}(y)}[\|G(F(y))-y\|^1]$ is the sum of cycle-consistency losses for both translations and $\|\blacksquare\|^1$ is the $l_1$ norm;

$\mathcal{L}_{identity}(G,F,x,y) = E_{y \sim P_{data}(y)}[\|G(y)-y\|^1] + E_{x \sim P_{data}(x)}[\|F(x)-x\|^1]$ is the sum of identity losses that ensure that the amplitude distributions of input and output signals are similar;

$\mathcal{L}_{CAM}(G,F,D_X,D_Y,x,y) = E_{y \sim P_{data}(y)}[(D_Y(y))^2] + E_{x \sim P_{data}(x)}[(1-D_Y(G(x)))^2] + E_{x \sim P_{data}(x)}[(D_X(x))^2] + E_{y \sim P_{data}(y)}[(1-D_X(F(y)))^2]$ is the sum of the least squares losses that introduce the attention maps.

In one or more embodiments, in order to obtain transfer results that generalize across multiple devices, several Cycle-GAN (or U-GAT-IT) models are used to transfer signals between several device pairs. In at least one embodiment, a fixed number of smartphones T is set and motion signals are collected from each of the T devices. In one or more embodiments, a fixed number of users that perform the registration on each of the T devices is set. The data collection is done before the UBA system is deployed into production, i.e., the end users are never asked to perform registrations on the T devices, which would be infeasible. The number of trained Cycle-GANs is T, such that each Cycle-GAN learns to translate the signals from a particular device to all other devices and vice versa, as illustrated in FIGS. 5A-5D, which are discussed in further detail below.

One goal of the systems and methods disclosed herein is to obtain generic Cycle-GAN models that are able to translate a signal captured on some original device to one of T devices in the set, irrespective of the original device. In at least one embodiment, the same scope can be achieved by using different GAN architectures, various networks depths, learning rates or optimization algorithms. The generalization capacity is ensured by learning to translate from multiple devices to a single one instead of just learning to translate from a device to another. Thus, the translation algorithms (e.g., Cycle-GANs) of the disclosed embodiments can be applied to translate a signal captured on some user's device to one of the T devices in the set, without knowing the user or having information about the device he/she is using, during training of the translation algorithms (e.g., Cycle-GAN models). Each time the original signal is translated to one of the T devices, the features of the owner's device are replaced with the features of a certain device from the set of T devices, while keeping the features specific to the user. By feeding both the original signals as well the translated ones to the ML system in accordance with one or more embodiments of the system for disentangling discriminative features of a user of a device from motion sensor data, the ML system can no longer learn discriminative features specific to the original device. This happens because the ML system is configured to place (classify) original and translated signals in the same class, and the most relevant way to obtain such a decision boundary is by looking at the features that are discriminative for the user.

EXEMPLARY EMBODIMENTS

Exemplary embodiments of the present systems and methods are discussed in further detail below with reference to FIGS. 5A-5D, 6A-6B, and 1A-1D, along with practical applications of the techniques and other practical scenarios where the systems and methods for disentangling discriminative features of a user of a device and authentication based on motion signals captured by mobile device motion sensors can be applied.

In one or more embodiments, the methods disclosed herein provide a modified UBA execution pipeline. The modified UBA execution pipeline is able to disentangle the discriminative features of the user from the discriminative features of the actions and the devices, as exemplified in FIGS. 5A-5D. FIGS. 5A-5D show a system and flow diagram for disentangling discriminative features of a user of a mobile device from motion sensor data and authenticating a user in accordance with one or more embodiments. The steps in the flow diagram of FIGS. 5A-5D can be performed using the exemplary system for disentangling discriminative features of a user of a device from motion sensor data including, for example, the mobile device 101 and/or the system server 105 of system 100. The steps in the flow diagram of FIGS. 5A-5D are detailed below:

1. During user registration or authentication, the motion signals 310 are captured by the mobile device 101 from the built-in sensors such as an accelerometer and a gyroscope.
2. The motion signals 310 are divided into smaller chunks 315.
3. Using a set of trained Cycle-GANs 400, new signals 500 (translated signals) are generated, simulating the authentication session of the user on other devices.
4. Inside the ML system 505, relevant features are extracted from the original and translated signal chunks to form feature vectors, by employing a set of feature extraction techniques.
5. During registration, inside the ML system 505, a classification model is trained on the feature vectors that correspond to the recorded and translated signal chunks 500.
6. During authentication, inside the ML system 505, the learned classification model is employed on the feature vectors that correspond to the recorded and translated signal chunks.
7. During authentication, to distinguish the legitimate user (smartphone owner) from potential attackers, a voting scheme or a meta-learning model is employed on the scores or labels obtained for the recorded and translated chunks that correspond to an authentication session.

These steps and others are further described and exemplified in the following exemplary methods of FIGS. 6A-6B.

In accordance with one or more embodiments, FIG. 6A discloses a high-level block diagram showing a computation flow for disentangling discriminative features of a user of a device from motion sensor data. In one or more embodiments, the method of FIG. 6A can be performed by the present systems, such as the exemplary system 100 of FIG. 1A. While many of the following steps are described as being performed by the mobile device 101 (FIG. 1A), in certain embodiments, one or more of the following steps can be performed by the system server (back-end server) 105, which is in communication with the mobile device 101.

With reference to FIG. 5A and FIGS. 1A-1D, the process begins at step S105, where the processor of the mobile device 101 is configured, by executing one or more software modules (e.g., the user interface module 170), to cause at least one motion sensor (e.g., accelerometer 135, gyroscope 136) of the mobile device to capture data from the user in the form of one or more motion signals. In one or more embodiments, the motion signals are multi-axis signals that correspond to the physical movement or interactions of the user with the device collected during a specified time domain from the at least one motion sensor of the mobile device. The physical movement of the user can be in the form of a "gesture," (e.g., finger tap or finger swipe) or other physical interaction with the mobile device (e.g., picking up the mobile device). For example, the motion sensors can collect or capture motion signals corresponding to the user writing their signature in the air (an "explicit" interaction) or the user tapping their phone (an "implicit" interaction). As such, the motion signals contain features that are specific to (discriminative of) the user, the action performed by the user (e.g., gesture), and the particular mobile device.

In one or more embodiments, collection or capture of motion signals by the motion sensors of the mobile device can be performed during one or more predetermined time windows, which are preferably short time windows. For example, in at least one embodiment, the time window can be approximately 2 seconds. In at least one embodiment, such as during enrollment of a user, the mobile device can be configured to collect (capture) motion signals from the user by prompting the user to make a particular gesture or explicit interaction. Moreover, in at least one embodiment, the mobile device can be configured to collect motion signals without prompting the user, such that the collected motion signals represent implicit gestures or interactions of the user with the mobile device. In one or more embodiments, the processor of the mobile device 101 can be configured, by executing one or more software modules (e.g., the database module 176) to save the captured motion signals in the database 185 of the mobile device or, alternatively, the captured motion signals can be saved in the databased 280 of the back-end server 105.

At step S110, the processor of the mobile device is configured, by executing one or more software modules (e.g., the segmentation module 173), to divide the one or more captured motion signals into segments. Specifically, the captured motion signals are divided into N number of smaller chunks or segments. As discussed previously, the disclosed systems and methods are configured, in part, to address the issue of distinguishing, in motion signals, features that are specific or unique to a particular user and features that are discriminative of the action performed by the user. As such, by dividing the motion signals into segments, the discriminative features of actions performed by the user are eliminated. In one or more embodiments, the step of dividing the one or more captured motion signals into segments comprises dividing each motion signal into a fixed number of segments, where each segment is of a fixed length. In one or more embodiments, at least some of the segments or chunks are overlapping segments or chunks.

With continued reference to FIG. 5A, at step S115, the processor of the mobile device is configured, by executing one or more software modules 530 (e.g., the conversion module 178), to convert the segments into translated segments using one or more trained translation algorithms, such as Cycle-consistent Generative Adversarial Networks (Cycle-GANs). As discussed previously, the present systems and methods are configured, in part, to address the issue of distinguishing, in the motion signals, between features that are specific or unique to a particular user and features that are discriminative of the mobile device of the user. By converting the segments into translated segments using Cycle-GANs, the present method effectively eliminates the discriminative features of the mobile device from the collected motion data signal(s) provided to the ML model.

More specifically, in accordance with one or more embodiments, the chunks/segments are considered to be individual samples, and these chunks/segments are provided as the input to the one or more translation algorithms (e.g., Cycle-GANs). In one or more embodiments that utilize Cycle-GANs, each Cycle-GAN is trained offline on a separate data set of motion signals collected on a predefined set, T, of different devices. Given a segment as the input, the Cycle-GAN converts each segment into a translated segment such that the translated segment corresponds to a segment as it would have been recorded on a device from the predefined set of T devices that is different from the mobile device of the user. In other words, the translated segments comprise one or more synthetic motion signals that simulate motion signals originating from another device. For example, the input segment of the motion signal x recorded on a device X is translated using a Cycle-GAN (generator) G, to make it seem that it was recorded on a different device Y.

Each time an original segment is translated using one of the Cycle-GANs, the features of the user's own device is replaced with the features of a certain device from the predefined set of T devices, while keeping the features specific to the user. As mentioned previously, one goal of the process is to separate the features in the motion signals that are specific (discriminative) of the user and those features that are merely specific (discriminative) of a device utilized by the user. Thus, in accordance with at least one embodiment, to obtain results specific to the user such that the user can be identified across multiple devices, several Cycle-GAN models (or U-GAT-IT or other translation algorithms) are used to translate the segments between several devices. In one or more embodiments, a fixed number of devices (e.g., smartphones) T is set and segments of motion signals from each of the T devices are collected. A fixed number of users that perform the registration on each of the T devices is also set. As such, a set number of Cycle-GANs are trained such that each Cycle-GAN learns to translate the segments from a particular device to all other devices in the set and vice versa, as illustrated in FIG. 4A. Therefore, in accordance with at least one embodiment, the present system results in generic Cycle-GAN models that are able to translate a signal captured on some original device to another device in a predefined set of T devices, irrespective of the original device.

It is noted that, in at least one embodiment, this step can be achieved by using different GAN architectures, various networks depths, learning rates or optimization algorithms. The generalization capacity is ensured by learning to translate from multiple devices to a single one instead of just learning to translate from one device to another. Thus, the Cycle-GANs can be applied to translate a signal captured on a user's device to another device in the set of T devices without knowing the user or having information about the device he or she is using, during training of the Cycle-GAN models. Each time the original segments are translated to one of the T devices in the set, the features of the user's device are replaced with the features of another device in the set of T devices, while keeping the features specific to the user.

In one or more embodiments of Step S115, once the input segments are translated, the processor of the mobile device is configured, by executing one or more software modules (e.g., conversion module 178), to translate the segments back. For instance, as mentioned in the earlier example, the input segment of the motion signal x recorded on a device X is translated using a Cycle-GAN (generator) G, to make it seem like it was recorded on a different device Y. The translated segment is then translated back to the original device X using a Cycle-GAN (generator) F. In accordance with at least one embodiment, a discriminator $D_Y$ then discriminates between signals recorded on the device Y and the signals generated by Cycle-GAN (generator) G. The generator G is optimized to fool the discriminator $D_Y$, while the discriminator $D_Y$ is optimized to separate the samples, in an adversarial fashion. In addition, in at least one embodiment, the whole system is optimized to reduce the reconstruction error computed after translating the signal x back to the original device X. Adding the reconstruction error to the overall loss function ensures the cycle-consistency.

With continued reference to FIG. 5A, at step S120, the processor of the mobile device is configured, by executing one or more software modules (e.g., the feature extraction module 172), to provide the segments and the translated segments to a machine learning system. The segments and translated segments provided as inputs to the machine learning system are considered individual samples.

At step S125, the processor of the mobile device is then configured, by executing one or more software modules, to extract discriminative features of the user from the segments and translated segments using the machine learning system that applies one or more feature extraction algorithms. For example, in one or more embodiments during a user registration process, the processor is configured to extract relevant features from the segments and translated segments to form feature vectors using one or more feature extraction techniques. At step S127, the processor is configured to employ and train a learned classification model on the feature vectors that correspond to the segments and the translated segments. In at least one embodiment, the machine learning system can be an end-to-end deep neural network, comprising both feature extraction (S125) and classification (S127) steps. In one or more embodiments, the machine learning system can be formed of two components (a feature extractor and a classifier) or three components (a feature extractor, a feature selection method—not shown—and a classifier). In either embodiment, a trainable component, namely a deep neural network or a classifier, is present. The trainable component is typically trained on a data set of samples (chunks of motion signals) and corresponding labels (user identifiers) by applying an optimization algorithm, e.g., gradient descent, with respect to a loss function that express how well the trainable component is able to predict the correct labels for the training data samples (original or translated segments collected during user registration), as would be understood by those skilled in the art. The goal of the optimization algorithm is to minimize the loss function, i.e., to improve the predictive capability of the trainable component. At step S130, the method ends.

Figure 5B:
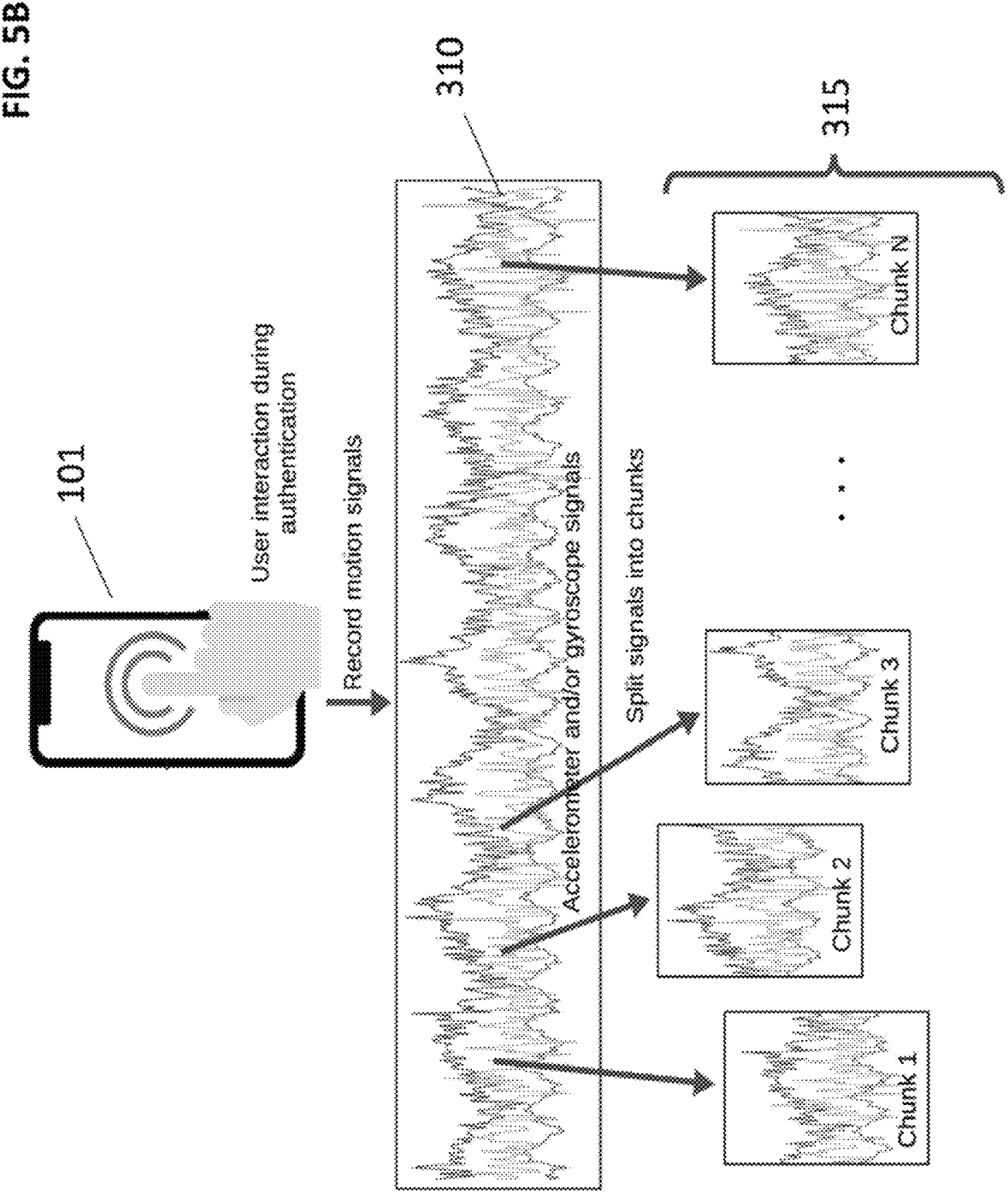

FIG. 6B discloses a high-level block diagram showing a computation flow for authenticating a user on a mobile device from motion sensor data in accordance with at least one embodiment. Referring now to FIG. 5B, the method starts at steps S105. Steps S105-S120 as shown in FIG. 6B are the same steps described above with regard to the method shown in FIG. 6A. Specifically, at step S105, one or more motion signals from a user are captured by the mobile device, and at step S110, the one or more captured motion signals are divided into segments. At step S115, the segments are converted into translated segments using one or more trained translation algorithms (e.g., Cycle-GANs), and at step S120, the segments and the translated segments are provided to a machine learning system.

With continued reference to FIG. 5B and FIGS. 1A-1D, after step S120, at step S135 the processor of the mobile device is configured, by executing one or more software modules (e.g., the classification module 174), to classify (e.g., score, assign class probabilities to) the segments and translated segments. More specifically, in one or more embodiments, the feature vectors representing segments and translated segments are analyzed and scored. In one or more embodiments, the segments and translated segments can correspond to an authentication session such that the segments and translated segments are scored according to a machine learning model, e.g., a classifier or a deep neural network, that was previously trained, at step S127 in FIG. 6A, on data collected during user registration.

At step S140, the mobile device is configured, by executing one or more software modules 130 (e.g., the meta-learning module 175), to apply a voting scheme or a meta-learning model on the scores (e.g., class probabilities) assigned to the segments and translated segments obtained during an authentication session. By applying the voting scheme or the meta-learning model, the mobile device is configured to provide a unanimous decision to authorize or reject the user. In one or more embodiments, the unanimous decision for the session is based on a voting scheme or meta-learning model that is applied to the scores of all the segments and translated segments.

Finally, at step S145 the mobile device is configured, by executing one or more software modules (e.g., the meta-learning module 175), to determine based on the voting or meta-learning step, whether the user is an authorized user. As mentioned previously, the segments and translated segments are scored according to the class probabilities given as output by a machine learning model that was trained, during registration, to identify a known user. As such, based on the voting scheme or the meta-learner applied on scores of the respective segments and translated segments, the processor is configured to determine whether the segments and translated segments belong to a particular (authorized) user or not, and thus ultimately determine whether the user is an authorized user or an unauthorized user. The authentication process disclosed herein refers to one-to-one authentication (user verification). At step S150, the method for authenticating a user based on the motion sensor data ends.

Experimental Results

In this section, experimental results obtained with the disentangling method disclosed herein are presented in accordance with one or more embodiments. Two different data sets were used in the following experiments. The first dataset (hereinafter referred to as the 5×5 database) consists of signals recorded from accelerometer and gyroscope from 5 smartphones, when utilized by 5 individuals to perform authentications. The individuals were asked to vary the position during the authentication (i.e., to stand up, or to sit down and to use the right or the left hand), thus performing different generic actions. In each position, signals from 50 authentications were captured, which means that each individual performed a total of 1000 authentications on each of the 5 smartphones, i.e., the total number of sessions is 5000. The second dataset (hereinafter referred to as the 3×3 database) was formed with the same positional variations as in the first one, but with 3 different people and 3 different smartphones.

The signals from each database were divided into 25 chunks in the preprocessing phase. The signal chunks resulting from the 5×5 dataset are used to train 5 Cycle-GANs with the purpose of translating signals to and from the 5 devices. Then, each of the signal chunks obtained from the 3×3 database are fed into the trained GANs obtaining, this way, an entirely new set of signals. These new (translated) signals are further divided into two subsets: one used to train and the other one used to test an ML system for user identification based on motion signals.

It is well known that GAN training is highly unstable and difficult, because the GAN is required to find a Nash equilibrium of a non-convex minimax game with high dimensional parameters. However, in these experiments, a monotonic descent of the loss function was observed for the generative networks, sustaining the idea that an equilibrium point was achieved.

By dividing the signals into chunks, the user discriminative features were captured and the importance of the movements (actions) were minimized. A clear proof is that by feeding the chunks of signal (without applying GANs) into the ML system, a 4% accuracy increase in user recognition was observed. Translating the user behavior across different mobile devices (by applying GANs) led to an additional increase in user recognition accuracy by another 3% (relative to the accuracy obtained from using the signal chunks alone). Therefore, it can be concluded that through simulating features from various devices, a ML system that is more robust and invariant to device features was obtained.

Along with the growth of the number of mobile devices, the frequency of attacks has risen significantly. Therefore, various user behavior analysis algorithms were proposed in recent years, including systems based on signals captured by motion sensors during user authentication. A major problem that algorithms based on motion sensor data face nowadays is that it is very difficult to disentangle features specific to the users from those specific to actions and devices. The systems and methods of the present application tackle this problem by dividing motion signals into chunks and by using translation algorithms (e.g., Cycle-GANs) to translate the signals to other devices, without requiring any changes to the user registration process.

Indeed, dividing the signals into smaller chunks helps to reduce the influence of the actions (performed by the user) over the decision boundary of the ML system, rising the user identification accuracy by 4%, as shown in the above examples. Furthermore, it is well known that the sensors from different devices are different because of the fabrication process, even if the devices are the same make and model, and come out of the same production line. This fact leads to an important influence of the mobile device sensors over the decision boundary of the ML system for user identification. In accordance with one or more embodiments, the systems and methods disclosed herein, utilizing GANs, simulate authentications from multiple devices based on recorded motion signals from an arbitrary device, diminish the influence of mobile devices over the ML system, and increase the influence of the features that are specific to the user. The disclosed systems and methods further improve the ML system accuracy by about 3%. Accordingly, overall, in one or more embodiments, the present systems and methods can boost performance by 7%, reducing both false positive and false negative rates.

Exemplary systems and methods for disentangling discriminative features of a user of a device from motion signals and for authenticating a user on a mobile device from motion signals are set out in the following items:

Item 1. A computer implemented method for disentangling discriminative features of a user of a device from motion signals captured by a mobile device having one or more motion sensors, a storage medium, instructions stored on the storage medium, and a processor configured by executing the instructions, comprising:
dividing, with the processor, each captured motion signal into segments;
converting, with the processor using one or more trained translation algorithms, the segments into translated segments;
providing, with the processor, the segments and the translated segments to a machine learning system; and
extracting, with the processor using the machine learning system that applies one or more feature extraction algorithms, discriminative features of the user from the segments and translated segments.

Item 2. The method of item 1, wherein the discriminative features of the user are used to identify the user upon future use of the device by the user.

Item 3. The method of the preceding items, wherein the one or more motion sensors comprise at least one of a gyroscope and an accelerometer.

Item 4. The method of the preceding items, wherein the one or more motion signals corresponds to one or more interactions between the user and the mobile device.

Item 5. The method of the preceding items, wherein the motion signals include discriminative features of the user, discriminative features of actions performed by the user and discriminative features of the mobile device.

Item 6. The method of item 5, wherein the step of dividing the one or more captured motion signals into the segments eliminates the discriminative features of actions performed by the user.

Item 7. The method of item 5, wherein the step of converting the segments into the translated segments eliminates the discriminative features of the mobile device.

Item 8. The method of the preceding items, wherein the one or more trained translation algorithms comprise one or more Cycle-consistent Generative Adversarial Networks (Cycle-GANs), and wherein the translated segments comprise synthetic motion signals that simulate motion signals originating from another device.

Item 9. The method of the preceding items, wherein the step of dividing the one or more captured motion signals into segments comprises dividing each motion signal into a fixed number of segments, wherein each segment is of a fixed length.

Item 10. A computer implemented method for authenticating a user on a mobile device from motion signals captured by a mobile device having one or more motion sensors, a storage medium, instructions stored on the storage medium, and a processor configured by executing the instructions, comprising:
dividing, with the processor, the one or more captured motion signals into segments;
converting, with the processor using one or more trained translation algorithms, the segments into translated segments;
providing, with the processor, the segments and the translated segments to a machine learning system; and
classifying, with the processor, the segments and translated segments as belonging to an authorized user or as belonging to an unauthorized user by assigning a score to each of the segments and translated segments; and
applying, with the processor, a voting scheme or a meta-learning model on the scores assigned to the segments and translated segments; and
determining, with the processor, based on the voting scheme or meta-learning model, whether the user is an authorized user.

Item 11. The method of item 10, wherein the step of scoring comprises:
comparing the segments and translated segments to features of the authorized user extracted from sample segments provided by the authorized user during an enrollment process, wherein the features are stored on the storage medium; and
assigning each segment with a score based on the classification model.

Item 12. The method of item 10 or 11, wherein the one or more motion sensors comprise at least one of a gyroscope and an accelerometer.

Item 13. The method of items 10-12, wherein the step of dividing the one or more captured motion signals into segments comprises dividing each motion signal into a fixed number of segments, wherein each segment is of a fixed length.

Item 14. The method of items 10-13, wherein at least a portion of the segments are overlapping.

Item 15. The method of items 10-14, wherein the one or more trained translation algorithms comprise one or more Cycle-GANs, and wherein the step of converting comprises:
translating the segments via a first generator into the translated segments, which mimic segments generated on another device; and re-translating the translated segments via a second generator to mimic segments generated on the mobile device.

Item 16. The method of items 10-15, wherein the translated segments comprise synthetic motion signals that simulate motion signals originating from another device.

Item 17. The method of items 10-16, wherein the providing step comprises:

extracting, with the processing using one or more feature extraction techniques, features from the segments and translated segments to form feature vectors; and employing a learned classification model on the feature vectors that correspond to the segments and the translated segments.

Item 18. A system for disentangling discriminative features of a user of a device from motion signals captured on a mobile device having at least one motion sensor and authenticating a user on the mobile device, the system comprising:

a network communication interface;

a computer-readable storage medium;

a processor configured to interact with the network communication interface and the computer readable storage medium and execute one or more software modules stored on the storage medium, including:

a segmentation module that when executed configures the processor to divide each captured motion signal into segments;

a conversion module that when executed configures the processor to convert the segments into translated segments using one or more trained Cycle-consistent Generative Adversarial Networks (Cycle-GANs);

a feature extraction module that when executed configures the processor to extract extracting discriminative features of the user from the segments and translated segments, with the processor using a machine learning system;

a classification module that when executed configures the processor to assign scores to the segments and translated segments and determine whether the segments and translated segments belong to an authorized user or an unauthorized user based on their respective scores; and a meta-learning module that when executed configures the processor to apply a voting scheme or a meta-learning model based on the scores assigned to the segments and translated segments based on stored segments corresponding to the user.

Item 19. The system of item 18, wherein the at least one motion sensor comprises at least one of a gyroscope and an accelerometer.

Item 20. The system of items 18-19, wherein the conversion module configures the processor to translate the segments via a first generator into the translated segments, which mimic segments generated on another device and re-translate the translated segments via a second generator to mimic segments generated on the mobile device.

Item 21. The system of items 18-20, wherein the feature extraction module is further configured to employ a learned classification model on the extracted features that correspond to the segments and the translated segments.

At this juncture, it should be noted that although much of the foregoing description has been directed to systems and methods for disentangling discriminative features of a user and user authentication using motion sensor data, the systems and methods disclosed herein can be similarly deployed and/or implemented in scenarios, situations, and settings beyond the referenced scenarios.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. It is to be understood that like numerals in the drawings represent like elements through the several figures, and that not all components and/or steps described and illustrated with reference to the figures are required for all embodiments or arrangements.

Thus, illustrative embodiments and arrangements of the disclosed systems and methods provide a computer implemented method, computer system, and computer program product for user authentication using motion sensor data. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A computer implemented method for disentangling discriminative features of a user of a device from motion signals captured by a mobile device having one or more motion sensors, comprising:
   providing, at a processor, one or more captured motion signals captured by the mobile device, wherein the captured motion signals are multi-axis signals in a time domain that correspond to the physical movement or interactions of the user with the mobile device collected over a period of time from the one or more motion sensors, and wherein the captured motion signals include discriminative features of the user, discriminative features of actions performed by the user, and discriminative features of the mobile device;
   dividing, with the processor, each captured motion signal into segments;
   generatively converting, with the processor using one or more trained translation algorithms, the segments into translated segments, wherein the one or more trained translation algorithms comprise multiple Cycle-consistent Generative Adversarial Networks (Cycle-GANs), and wherein the translated segments comprise synthetic motion signals that simulate motion signals originating from another device, while preserving the discriminative features of the user;
   providing, with the processor, the segments and the translated segments as inputs to a machine learning system; and
   extracting, with the processor using the machine learning system that applies one or more feature extraction algorithms, discriminative features of the user from the segments and translated segments, wherein the discriminative features of the user are usable to identify the user.

2. The method of claim 1, wherein the one or more motion sensors comprise at least one of a gyroscope and an accelerometer.

3. The method of claim 1, wherein the one or more motion signals corresponds to one or more interactions between the user and the mobile device.

4. The method of claim 1, wherein the cycle-GANs are configured to generatively convert the motion signals into the translated segments that simulate motion signals originating from another device, and that include the discriminative features of the user and discriminative features of another device.

5. The method of claim 4, wherein the step of dividing the one or more captured motion signals into the segments eliminates the discriminative features of actions performed by the user.

6. The method of claim 4, wherein the steps of generatively converting the segments into the translated segments and providing the segments and translated segments to the machine learning system effectively eliminates the discriminative features of the mobile device.

7. The method of claim 1, wherein the step of dividing the one or more captured motion signals into segments comprises dividing each motion signal into a fixed number of segments, wherein each segment is of a fixed length.

8. A computer implemented method for authenticating a user of a mobile device from motion signals captured by the mobile device having one or more motion sensors, comprising:
   providing, at a processor, one or more captured motion signals, wherein the captured motion signals are multi-axis signals in a time domain that correspond to the physical movement or interactions of the user with the mobile device collected over a period of time from the one or more motion sensors, and wherein the captured motion signals include discriminative features of the user, discriminative features of actions performed by the user, and discriminative features of the mobile device;
   dividing, with the processor, the one or more captured motion signals into segments;
   generatively converting, with the processor using trained translation algorithms, the segments into translated segments, wherein the trained translation algorithms comprise multiple Cycle-consistent Generative Adversarial Networks (Cycle-GANs), and wherein the translated segments comprise synthetic motion signals that simulate motion signals originating from another device, while preserving the discriminative features of the user;
   providing, with the processor, the segments and the translated segments as inputs to a machine learning system; and
   classifying, with the processor using the machine learning system, the segments and translated segments as belonging to an authorized user or as belonging to an unauthorized user by assigning a score to each of the segments and translated segments;
   applying, with the processor, a voting scheme or a meta-learning model on the scores assigned to the segments and translated segments; and
   determining, with the processor based on the voting scheme or meta-learning model, whether the user is an authorized user.

9. The method of claim 8, wherein the step of classifying comprises:
   comparing the segments and translated segments to features of the authorized user extracted from sample segments of the authorized user during an enrollment process, wherein the features are stored on a storage medium; and
   assigning each segment with a score based on a classification model.

10. The method of claim 8, wherein the one or more motion sensors comprise at least one of a gyroscope and an accelerometer.

11. The method of claim 8, wherein the step of dividing the one or more captured motion signals into segments comprises dividing each motion signal into a fixed number of segments, wherein each segment is of a fixed length.

12. The method of claim 8, wherein at least a portion of the segments are overlapping.

13. The method of claim 8, wherein the step of converting comprises:
translating the segments via a first generator into the translated segments, which mimic segments generated on another device; and
re-translating the translated segments via a second generator to mimic segments generated on the mobile device.

14. The method of claim 8, wherein the translated segments comprise synthetic motion signals that simulate motion signals originating from another device.

15. The method of claim 8, wherein the providing step comprises:
extracting, with the processing using one or more feature extraction techniques, features from the segments and translated segments to form feature vectors; and
employing a learned classification model on the feature vectors that correspond to the segments and the translated segments.

16. A system for disentangling discriminative features of a user of a device from motion signals captured on a mobile device having at least one motion sensor and authenticating the user of the mobile device, the system comprising:
a network communication interface;
a computer-readable storage medium;
a processor configured to interact with the network communication interface and the computer readable storage medium and execute one or more software modules stored on the storage medium, including:
a segmentation module that when executed configures the processor to divide each captured motion signal into segments, wherein the captured motion signals are multi-axis signals in a time domain that correspond to the physical movement or interactions of the user with the mobile device collected over a period of time from the one or more motion sensors, and wherein the captured motion signals include discriminative features of the user, discriminative features of actions performed by the user, and discriminative features of the mobile device;
a conversion module that when executed configures the processor to generatively convert the segments into translated segments using multiple trained Cycle-consistent Generative Adversarial Networks (Cycle-GANs), wherein the translated segments comprise synthetic motion signals that simulate motion signals originating from another device, while preserving the discriminative features of the user;
a feature extraction module that when executed configures the processor to extract extracting discriminative features of the user from the segments and translated segments, with the processor using a machine learning system;
a classification module that when executed configures the processor to assign scores to the segments and translated segments and determine whether the segments and translated segments belong to an authorized user or an unauthorized user based on their respective scores; and
a meta-learning module that when executed configures the processor to apply a voting scheme or a meta-learning model on the scores assigned to the segments and translated segments based on stored segments corresponding to the user.

17. The system of claim 16, wherein the at least one motion sensor comprises at least one of a gyroscope and an accelerometer.

18. The system of claim 16, wherein the conversion module configures the processor to translate the segments via a first generator into the translated segments, which mimic segments generated on another device and re-translate the translated segments via a second generator to mimic segments generated on the mobile device.

19. The system of claim 16, wherein the feature extraction module is further configured to employ a learned classification model on the extracted features that correspond to the segments and the translated segments.

\* \* \* \* \*